(12) United States Patent
McCormick et al.

(10) Patent No.: US 7,542,257 B2
(45) Date of Patent: Jun. 2, 2009

(54) POWER CONTROL METHODS AND APPARATUS FOR VARIABLE LOADS

(75) Inventors: Kevin McCormick, Cambridge, MA (US); Ihor A. Lys, Milton, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 467 days.

(21) Appl. No.: 11/225,377

(22) Filed: Sep. 12, 2005

(65) Prior Publication Data
US 2006/0132061 A1    Jun. 22, 2006

Related U.S. Application Data

(60) Provisional application No. 60/608,607, filed on Sep. 10, 2004.

(51) Int. Cl.
*H02H 3/20* (2006.01)
*H02H 9/04* (2006.01)
*H02H 3/00* (2006.01)

(52) U.S. Cl. .......................................... 361/91.1; 361/86
(58) Field of Classification Search ....................... None
See application file for complete search history.

(56) References Cited

U.S. PATENT DOCUMENTS

| | | | |
|---|---|---|---|
| 5,402,059 A | 3/1995 | Bittar | |
| 5,640,061 A | 6/1997 | Bornhorst et al. | |
| 5,786,992 A | 7/1998 | Vinciarelli et al. | |
| 6,016,038 A | 1/2000 | Mueller et al. | |
| 6,091,614 A * | 7/2000 | Malenfant | 363/97 |
| 6,150,774 A | 11/2000 | Mueller et al. | |
| 6,166,496 A | 12/2000 | Lys et al. | |
| 6,211,626 B1 | 4/2001 | Lys et al. | |
| 6,292,901 B1 | 9/2001 | Lys et al. | |
| 6,304,464 B1 | 10/2001 | Jacobs et al. | |

(Continued)

FOREIGN PATENT DOCUMENTS

| | | |
|---|---|---|
| WO | 03/069958 | 8/2003 |
| WO | 2004/057924 | 7/2004 |
| WO | 2004/100612 | 11/2004 |
| WO | 2004/100614 | 11/2004 |
| WO | 2005/009086 | 1/2005 |

OTHER PUBLICATIONS

Adragna, Claudio et al., AN1060, Application Note, Flyback Converters With the L6561 PFC Controller, Jun. 2001, 11 pages, www.datasheetcatalog.com.

(Continued)

*Primary Examiner*—Stephen W Jackson
*Assistant Examiner*—Dharti H Patel

(57) ABSTRACT

A switching power supply is modified to mitigate potentially adverse effects of near zero loads on power delivery. In one example, a processor-controlled dummy load is coupled to the power supply output in addition to an actual load. The dummy load is controlled so that at least some minimal load is presented to the power supply when the actual load is drawing low or near zero power. In another example, the feedback loop of the switching power supply is modified to mitigate the effects of a potential overvoltage condition in a bias supply from which the switch controller of the power supply draws power, which condition may occur at low or near zero load power. A lighting system may include a switching power supply thusly modified to provide power to a variable load that includes one or more LED-based lighting apparatus.

23 Claims, 18 Drawing Sheets

U.S. PATENT DOCUMENTS

| | | |
|---|---|---|
| 6,340,868 B1 | 1/2002 | Lys et al. |
| 6,369,525 B1 | 4/2002 | Chang et al. |
| 6,459,919 B1 | 10/2002 | Lys et al. |
| 6,495,964 B1 | 12/2002 | Muthu et al. |
| 6,510,995 B2 | 1/2003 | Muthu et al. |
| 6,528,954 B1 | 3/2003 | Lys et al. |
| 6,548,967 B1 | 4/2003 | Dowling et al. |
| 6,549,429 B2 * | 4/2003 | Konno .................... 363/21.04 |
| 6,577,080 B2 | 6/2003 | Lys et al. |
| 6,586,890 B2 | 7/2003 | Min et al. |
| 6,608,453 B2 | 8/2003 | Morgan et al. |
| 6,618,031 B1 | 9/2003 | Bohn, Jr. et al. |
| 6,624,597 B2 | 9/2003 | Dowling et al. |
| 6,667,583 B2 | 12/2003 | Kerenyi |
| 6,717,376 B2 | 4/2004 | Lys et al. |
| 6,720,745 B2 | 4/2004 | Mueller et al. |
| 6,734,639 B2 | 5/2004 | Chang et al. |
| 6,756,771 B1 * | 6/2004 | Ball et al. .................... 323/222 |
| 6,768,047 B2 | 7/2004 | Chang et al. |
| 6,774,584 B2 | 8/2004 | Lys et al. |
| 6,777,891 B2 | 8/2004 | Lys et al. |
| 6,781,329 B2 | 8/2004 | Morgan et al. |
| 6,788,011 B2 | 9/2004 | Mueller et al. |
| 6,801,003 B2 | 10/2004 | Schanberger et al. |
| 6,806,659 B1 | 10/2004 | Mueller et al. |
| 6,836,081 B2 | 12/2004 | Swanson et al. |
| 6,853,150 B2 | 2/2005 | Clauberg et al. |
| 6,869,204 B2 | 3/2005 | Piepgras et al. |
| 6,883,929 B2 | 4/2005 | Dowling |
| 6,888,322 B2 | 5/2005 | Dowling et al. |
| 6,888,529 B2 | 5/2005 | Bruning et al. |
| 6,897,624 B2 | 5/2005 | Ducharme et al. |
| 6,930,452 B2 | 8/2005 | De Krijger et al. |
| 6,930,893 B2 | 8/2005 | Vinciarelli |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,294,989 B2 * | 11/2007 | Saren ........................ 318/805 |
| 2002/0038157 A1 | 3/2002 | Dowling et al. |
| 2002/0044066 A1 | 4/2002 | Dowling et al. |
| 2002/0048169 A1 | 4/2002 | Dowling et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0130627 A1 | 9/2002 | Dowling et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0158583 A1 | 10/2002 | Lys et al. |
| 2002/0176259 A1 | 11/2002 | Ducharme |
| 2003/0011538 A1 | 1/2003 | Lys et al. |
| 2003/0028260 A1 | 2/2003 | Blackwell |
| 2003/0057884 A1 | 3/2003 | Dowling et al. |
| 2003/0057887 A1 | 3/2003 | Dowling et al. |
| 2003/0076281 A1 | 4/2003 | Morgan et al. |
| 2003/0085749 A1 | 5/2003 | Xu et al. |
| 2003/0100837 A1 | 5/2003 | Lys et al. |
| 2003/0133292 A1 | 7/2003 | Mueller et al. |
| 2003/0222587 A1 | 12/2003 | Dowling et al. |
| 2004/0036006 A1 | 2/2004 | Dowling |
| 2004/0052076 A1 | 3/2004 | Mueller et al. |
| 2004/0090191 A1 | 5/2004 | Mueller et al. |
| 2004/0090787 A1 | 5/2004 | Dowling et al. |
| 2004/0095185 A1 | 5/2004 | Bucks et al. |
| 2004/0105261 A1 | 6/2004 | Ducharme et al. |
| 2004/0113568 A1 | 6/2004 | Dowling et al. |
| 2004/0116039 A1 | 6/2004 | Mueller et al. |
| 2004/0130909 A1 | 7/2004 | Mueller et al. |
| 2004/0145320 A1 | 7/2004 | Nijhof et al. |
| 2004/0178751 A1 | 9/2004 | Mueller et al. |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2005/0029527 A1 | 2/2005 | Yamamoto et al. |
| 2005/0099824 A1 | 5/2005 | Dowling et al. |
| 2005/0116667 A1 | 6/2005 | Mueller et al. |
| 2005/0122065 A1 | 6/2005 | Young |
| 2005/0151489 A1 | 7/2005 | Lys et al. |
| 2005/0213352 A1 | 9/2005 | Lys et al. |
| 2005/0213353 A1 | 9/2005 | Lys |
| 2005/0218838 A1 | 10/2005 | Lys |
| 2005/0218870 A1 | 10/2005 | Lys |
| 2005/0219872 A1 | 10/2005 | Lys |
| 2005/0231133 A1 | 10/2005 | Lys |
| 2005/0236029 A1 | 10/2005 | Dowling |
| 2005/0236998 A1 | 10/2005 | Mueller |
| 2005/0253533 A1 | 11/2005 | Lys et al. |
| 2005/0275626 A1 | 12/2005 | Mueller |
| 2005/0276053 A1 | 12/2005 | Nortrup |
| 2006/0002110 A1 | 1/2006 | Dowling |

OTHER PUBLICATIONS

Adragna, Claudio, AN1007, Application Note, L6561—Based Switcher Replaces Mag Amps in Silver Boxes, Mar. 1998, 6 pages, www.datasheetcatalog.com.

Adragna, Claudio, AN1059, Application Note, Design Equations of High-Power-Factor Flyback Converters Based on the L6561, Sep. 2003, 20 pages, www.datasheetcatalog.com.

Adragna, Claudio, AN1792, Application Note, Design of Fixed-Off-Time-Controlled PFC Pre-Regulators With the L6562, Nov. 2003, 30 pages, www.datasheetcatalog.com.

Adragna, Claudio, AN966, Application Note, L6561, Enhanced Transition Mode Power Factor Corrector, Oct. 2001, 20 pages, www.datasheetcatalog.com.

Salati, Luca, AN1757, Application Note, Switching From the L6561 to the L6562, Apr. 2004, 9 pages, www.datasheetcatalog.com.

* cited by examiner

POWER CONTROL METHODS AND APPARATUS FOR VARIABLE LOADS

CROSS-REFERENCE TO RELATED APPLICATION

The present application claims the benefit, under 35 U.S.C. §119(e), of U.S. Provisional Application Ser. No. 60/608,607, filed Sep. 10, 2004, entitled "Power Control Methods and Apparatus," which application is hereby incorporated herein by reference.

FIELD OF THE INVENTION

The present disclosure relates generally to modifications to switching power supplies that facilitate improved power delivery for a highly variable load, especially at near zero load conditions.

BACKGROUND

A DC-DC converter is a well-known electrical device that accepts a DC input voltage and provides a DC output voltage. DC-DC converters generally are configured to provide a regulated DC output voltage to a load based on an unregulated DC input voltage which in some cases is different from the regulated output voltage. For example, in many automotive applications in which a battery provides a DC power source having an unregulated voltage of approximately 12 Volts, a DC-DC converter may be employed to receive the unregulated 12 Volts DC as an input and provide a regulated DC output voltage to drive various electronic circuitry in a vehicle (instrumentation, accessories, engine control, lighting, radio/stereo, etc.). The regulated DC output voltage may be lower, higher or the same as the input voltage from the battery.

More generally, a DC-DC converter may be employed to transform an unregulated voltage provided by any of a variety of DC power sources such as batteries to a more appropriate regulated voltage for driving a given load. In some cases, the unregulated DC input voltage may be derived from an AC power source, such as a 120 Vrms/60 Hz AC line voltage which is rectified and filtered by a bridge rectifier/filter circuit arrangement. In this case, as discussed further below, protective isolation components are employed in the DC-DC converter to ensure safe operation, given the potentially dangerous voltages involved.

FIG. 1 illustrates a circuit diagram of a conventional step-down DC-DC converter 50 configured to provide a regulated DC output voltage 32 ($V_{out}$) to a load 40, based on a higher unregulated DC input voltage 30 ($V_{in}$). The step-down converter of FIG. 1 also is commonly referred to as a "buck" converter. From a functional standpoint, the buck converter of FIG. 1 generally is representative of other types of DC-DC converters, some examples of which are discussed in turn below.

DC-DC converters like the buck converter of FIG. 1 employ a transistor or equivalent device that is configured to operate as a saturated switch which selectively allows energy to be stored in an energy storage device (e.g., refer to the transistor switch 20 and the inductor 22 in FIG. 1). Although FIG. 1 illustrates such a transistor switch as a bipolar junction transistor (BJT), field effect transistors (FETs) also may be employed as switches in various DC-DC converter implementations. By virtue of employing such a transistor switch, DC-DC converters also are commonly referred to as "switching regulators" due to their general functionality.

In particular, the transistor switch 20 in the circuit of FIG. 1 is operated to periodically apply the unregulated DC input voltage 30 ($V_{in}$) across an inductor 22 (L) for relatively short time intervals. During the intervals in which the transistor switch is "on" or closed (i.e., passing the input voltage $V_{in}$ to the inductor), the inductor stores energy from the applied input voltage in the inductor's magnetic field. When the switch is turned "off" or opened (i.e., the DC input voltage is removed from the inductor), the stored energy is transferred to a filter capacitor 34 which functions to provide a relatively smooth DC output voltage $V_{out}$ to the load 40 (i.e., the capacitor provides essentially continuous energy to the load between inductor energy storage cycles).

More specifically, in FIG. 1, when the transistor switch 20 is on, a voltage $V_L=V_{out}-V_{in}$ is applied across the inductor 22. This applied voltage causes a linearly increasing current $I_L$ to flow through the inductor (and to the load and the capacitor) based on the relationship $V_L=L \cdot dI_L/dt$. When the transistor switch 20 is turned off, the current $I_L$ through the inductor continues to flow in the same direction, with the diode 24 (D1) now conducting to complete the circuit. As long as current is flowing through the diode, the voltage $V_L$ across the inductor is fixed at $V_{out}-V_{diode}$, causing the inductor current $I_L$ to decrease linearly as energy is provided from the inductor's magnetic field to the capacitor and the load. FIG. 2 is a diagram illustrating various signal waveforms for the circuit of FIG. 1 during the switching operations described immediately above.

Conventional DC-DC converters may be configured to operate in different modes, commonly referred to as "continuous" mode and "discontinuous" mode. In continuous mode operation, the inductor current $I_L$ remains above zero during successive switching cycles of the transistor switch, whereas in discontinuous mode, the inductor current starts at zero at the beginning of a given switching cycle and returns to zero before the end of the switching cycle. To provide a simple yet informative analysis of the circuit of FIG. 1, the discussion below considers continuous mode operation, and assumes for the moment that there are no voltage drops across the transistor switch when the switch is on (i.e., conducting) and that there is a negligible voltage drop across the diode D1 while the diode is conducting current. With the foregoing in mind, the changes in inductor current over successive switching cycles may be examined with the aid of FIG. 3.

In particular, FIG. 3 is a graph on which is superimposed the voltage at the point $V_X$ shown in FIG. 1 (again, ignoring any voltage drop across the diode D1) based on the operation of the transistor switch 20, and the current through the inductor $I_L$ for two consecutive switching cycles. In FIG. 3, the horizontal axis represents time t and a complete switching cycle is represented by the time period T, wherein the transistor switch "on" time is indicated as $t_{on}$ and the switch "off" time is indicated as $t_{off}$ (i.e., $T=t_{on}+t_{off}$).

For steady state operation, it should be appreciated that the inductor current $I_L$ at the start and end of a switching cycle is essentially the same, as can be observed in FIG. 3. Accordingly, from the relation $V_L=L \cdot dI_L/dt$, the change of current $dI_L$ over one switching cycle is zero, and may be given by:

$$dI_L = 0 = \frac{1}{L}\left(\int_0^{t_{on}} (V_{in} - V_{out}) dt + \int_{t_{on}}^{T} (-V_{out}) dt\right)$$

which simplifies to $$(V_{in} - V_{out})t_{on} - (V_{out})(T - t_{on}) = 0$$

or $$\frac{V_{out}}{V_{in}} = \frac{t_{on}}{T} = D$$

where D is defined as the "duty cycle" of the transistor switch, or the proportion of time the switch is on and allowing energy to be stored in the inductor. From the foregoing, it can be seen that the ratio of the output voltage to the input voltage is proportional to D; namely, by varying the duty cycle D of the switch in the circuit of FIG. 1, the output voltage $V_{out}$ may be varied with respect to the input voltage $V_{in}$ but cannot exceed the input voltage, as the maximum duty cycle D is 1.

Hence, as mentioned earlier, the conventional buck converter of FIG. 1 is particularly configured to provide to the load 40 a regulated output voltage $V_{out}$ that is lower than the input voltage $V_{in}$. To ensure stability of the output voltage $V_{out}$, the buck converter employs a feedback control loop 46 to control the operation of the transistor switch 20. Generally, as shown in FIG. 1, power for various components of the feedback control loop 46 may be derived from the DC input voltage $V_{in}$ or another independent source of power.

In the feedback control loop 46 of FIG. 1, a sample of the DC output voltage $V_{out}$ is provided as an input to the feedback control loop 46 (e.g., via the resistors $R_2$ and $R_3$—see $V_{sample}$) and compared by an error amplifier 28 to a reference voltage $V_{ref}$. The reference voltage $V_{ref}$ is a stable scaled representation of the desired regulated output voltage $V_{out}$. The error amplifier 28 generates an error signal 38 (e.g., a positive voltage signal over some predetermined range) based on the comparison of $V_{sample}$ and $V_{ref}$ and the magnitude of this error signal ultimately controls the operation of the transistor switch 20, which in turn adjusts the output voltage $V_{out}$ via adjustments to the switch's duty cycle. In this manner, the feedback control loop maintains a stable regulated output voltage $V_{out}$.

More specifically, the error signal 38 serves as a control voltage for a pulse width modulator 36 which also receives a pulse stream 42 having a frequency f=1/T provided by an oscillator 26. In conventional DC-DC converters, exemplary frequencies f for the pulse stream 42 include, but are not limited to, a range from approximately 50 kHz to 100 kHz. The pulse width modulator 36 is configured to use both the pulse stream 42 and the error signal 38 to provide an on/off control signal 44 that controls the duty cycle of the transistor switch 20. In essence, a pulse of the pulse stream 42 causes the pulse width modulator to turn the transistor switch 20 on, and the error signal 38 determines how long the transistor switch stays on (i.e., the length of the time period $t_{on}$ and hence the duty cycle D).

For example, if the error signal 38 indicates that the sampled output voltage is higher than $V_{ref}$ (i.e., the error signal 38 has a relatively lower value), the pulse width modulator 36 is configured to provide a control signal 44 with relatively shorter duration "on" pulses or a lower duty cycle (thereby providing relatively less energy to the inductor while the transistor switch 20 is on). In contrast, if the error signal 38 indicates that the sampled output voltage is lower than $V_{ref}$ (i.e., the error signal has a relatively higher value), the pulse width modulator is configured to provide a control signal with relatively longer duration "on" pulses or a higher duty cycle (thereby providing relatively more energy to the inductor while the transistor switch 20 is on). Accordingly, by modulating the duration of the "on" pulses of the control signal 44 via the error signal 38, the output voltage $V_{out}$ is regulated to approximate a desired output voltage represented by $V_{ref}$.

Other types of conventional DC-DC converters in addition to the buck converter discussed above in connection with FIG. 1 include, for example, a step-up or "boost" converter which provides a regulated DC output voltage that is higher than the input voltage, an inverting or "buck-boost" converter that may be configured to provide a regulated DC output voltage that is either lower or higher than the input voltage and has a polarity opposite to that of the input voltage, and a "CUK" converter that is based on capacitive energy transfer principals. Like the buck converter, in each of these other types of converters the duty cycle D of the transistor switch determines the ratio of the output voltage $V_{out}$ to the input voltage $V_{in}$.

FIG. 4 illustrates a conventional boost converter 52 and FIG. 5 illustrates a conventional buck-boost converter or inverting regulator 54. Both of these converters may be analyzed similarly to the buck converter of FIG. 1 to determine how the duty cycle D affects the ratio $V_{out}/V_{in}$. FIG. 6 illustrates an example of a "CUK" converter 56, which employs capacitive rather than primarily inductive energy transfer to a load based on current balance in a capacitor. The circuit of FIG. 6 is derived from a duality principle based on the buck-boost converter of FIG. 5 (i.e., the relationship between the duty cycle D and the ratio $V_{out}/V_{in}$ in the CUK converter is identical to that of the buck-boost converter). One noteworthy characteristic of the CUK converter is that the input and output inductors $L_1$ and $L_2$ shown in FIG. 6 create a substantially smooth current at both the input and the output of the converter, while the buck, boost, and buck-boost converters have a pulsed input current (e.g., see FIG. 2, second diagram from top).

For all of the converters shown in FIGS. 4-6, the details of the voltage regulation feedback control loop have been omitted for simplicity; however, it should be appreciated that like the buck converter shown in FIG. 1, each of the converters shown in FIGS. 4-6 would include a feedback control loop to provide output voltage regulation, as discussed above in connection with FIG. 1.

In some conventional DC-DC converter configurations, an input current sensing and limiting technique also may be employed to facilitate improved operation of the converter, especially in continuous mode. Such converters commonly are referred to as "current-mode" regulators. One of the issues addressed by current-mode regulators is that of potentially unpredictable energy build-up in the inductor during successive switching cycles.

For example, with reference again to FIG. 3, since the inductor current $I_L$ remains above zero in continuous mode, the energy stored in the inductor's magnetic field at any given time may depend not only on energy stored during the most recent switching cycle, but also on residual energy that was stored during one or more previous switching cycles. This situation generally results in a somewhat unpredictable amount of energy being transferred via the inductor (or other energy transfer element) in any given switching cycle. Averaged over time, however, the smoothing function of the output capacitor 34 in the circuits discussed above, together with the voltage regulation function provided by the feedback control loop, facilitate a substantially controlled delivery of power to the load based on the regulated output voltage $V_{out}$.

The feedback control loop in the circuits discussed above, however, generally has a limited response time, and there may be some changes in input conditions (e.g., $V_{in}$) and/or output power requirements of the DC-DC converter that could compromise the stability of the feedback control loop. In view of the foregoing, current-mode regulators generally are configured to limit the peak current $I_P$ through the inductor when the transistor switch is on (e.g., refer to FIG. 3). This input current-limiting feature also helps to prevent excessive inductor currents in the event of significant changes in input conditions and/or significant changes in load requirements which call for (via the voltage regulation feedback control loop) a duty cycle that results in an inductor current which may adversely affect the stability of the feedback loop, and/or be potentially damaging to the circuit.

FIG. 7 is a circuit diagram illustrating an example of a current-mode regulator 58 based on the buck-boost converter configuration shown in FIG. 5. In the diagram of FIG. 7, details of the voltage regulation feedback control loop are shown to facilitate the discussion of input current limiting. It should be appreciated that the concepts discussed below in connection with the input current sensing and limiting features of the circuit of FIG. 7 may be similarly applied to the other types of conventional DC-DC converters discussed herein.

The feedback control loop which controls the operation of the transistor switch 20 in the current-mode circuit of FIG. 7 differs from that shown in FIG. 1 in that the circuit of FIG. 7 additionally includes an input current sensing device 60 (i.e., the resistor $R_{sense}$) and a comparator 62. Also, the pulse width modulator 36 used in the feedback control loop in the example of FIG. 7 is a D-type flip-flop with set and reset control. As shown in FIG. 7, the flip-flop pulse width modulator is arranged such that its "D" and "Clk" inputs are tied to ground, the oscillator 26 provides the pulse stream 42 to the "Set" input of the flip-flop (low activated, $\overline{S}$), the comparator 62 provides a signal 64 to the "Reset" input of the flip-flop (low activated, $\overline{R}$), and the flip-flop's "Q" output provides the pulse width modulated control signal 44.

In this arrangement, when the transistor switch 20 is off or open, there is no current through the resistor $R_{sense}$; hence, the voltage at the inverting input of the comparator 62 is zero. Recall also from FIG. 1 that the error signal 38 in this example is a positive voltage over some predetermined range that indicates the difference between the sampled output voltage and $V_{ref}$. Thus, when the transistor switch 20 is open, the signal 64 output by the comparator is a logic high signal (i.e., the reset input $\overline{R}$ of the flip-flop is not activated).

With the flip-flop in this state, the next low-going pulse of the pulse stream 42 activates the flip-flop's set input $\overline{S}$, thereby driving the flip-flop's Q output to a logic high state and turning the transistor switch 20 on. As discussed above, this causes the inductor current $I_L$ to increase, and with the switch closed this inductor current also passes through the resistor $R_{sense}$ ($I_{L(on)}$), thereby developing a voltage $V_{sense}$ across this resistor. When the voltage $V_{sense}$ exceeds the error signal 38, the signal 64 output by the comparator 62 switches to a logic low state, thereby activating the flip-flop's reset input $\overline{R}$ and causing the Q output to go low (and the transistor switch 20 to turn off). When the transistor is turned off, the voltage $V_{sense}$ returns to zero and the signal 64 returns to a logic high state, thereby deactivating the flip flop's reset input. At this point, the next occurrence of a low-going pulse of the pulse stream 42 activates the flip flop's set input $\overline{S}$ to start the cycle over again.

Accordingly, in the circuit of FIG. 7, the relationship between $V_{sense}$ and the error signal 38 determines the duty cycle D of the transistor switch 20; specifically, if the voltage $V_{sense}$ exceeds the error signal 38, the switch opens. Based on the foregoing, the peak current $I_P$ through the inductor (see FIG. 3) may be predetermined by selecting an appropriate value for the resistor $R_{sense}$, given the expected range of the error signal 38. The action of the comparator 62 ensures that even in situations where changes in load requirements cause $V_{sample}$ to be substantially below $V_{ref}$ (resulting in a relatively higher magnitude error signal and a potentially greater duty cycle), the current through the inductor ultimately may limit the duty cycle so that the inductor current does not exceed a predetermined peak current. Again, this type of "current-mode" operation generally enhances the stability of the feedback control loop and reduces potentially damaging conditions in the DC-DC converter circuitry.

For many electronics applications, power supplies may be configured to provide a regulated DC output voltage from an input AC line voltage (e.g., 120 $V_{rms}$, 60 Hz). For example, conventional "linear" power supplies typically employ a substantial (relatively large and heavy) 60 Hz power transformer to reduce the input AC line voltage at approximately 120 $V_{rms}$ to some lower (and less dangerous) secondary AC voltage. This lower secondary AC voltage then is rectified (e.g., by a diode bridge rectifier) and filtered to provide an unregulated DC voltage. Often, a linear regulator is then employed to provide a predetermined regulated DC voltage output based on the unregulated DC voltage.

By utilizing the unique switching action of a DC-DC converter, it is possible to design a power supply that does not require the substantial 60 Hz power transformer at the input stage typical of linear power supplies, thereby in many cases significantly reducing the size and weight and increasing the efficiency of the power supply. For example, power supplies based on linear regulators generally have power conversion efficiencies on the order of approximately 50% or lower, whereas power supplies based on switching regulators have efficiencies on the order of approximately 80% or higher.

In some power supplies based on switching regulators, an unregulated DC voltage may be provided as an input to a DC-DC converter directly from a rectified and filtered AC line voltage. Such an arrangement implies that there is no protective isolation between the AC line voltage and the DC input voltage to the DC-DC converter. Also, the unregulated DC input voltage to the converter may be approximately 160 Volts DC (based on a rectified 120 $V_{rms}$ line voltage) or higher (up to approximately 400 Volts if power factor correction is employed), which is potentially quite dangerous. In view of the foregoing, DC-DC converters for such power supply arrangements typically are configured with isolation features to address these issues so as to generally comport with appropriate safety standards.

FIG. 8 is a circuit diagram illustrating an example of such a power supply 66 incorporating a DC-DC converter or switching regulator. As discussed above, the power supply 66 receives as an input an AC line voltage 67 which is rectified by a bridge rectifier 68 and filtered by a capacitor 35 ($C_{filter}$) to provide an unregulated DC voltage as an input $V_{in}$ to the DC-DC converter portion 69. The DC-DC converter portion 69 is based on the inverting regulator (buck-boost) arrangement shown in FIG. 5; however, in FIG. 8, the energy-storage inductor has been replaced with a high frequency transformer 72 to provide isolation between the unregulated high DC input voltage $V_{in}$ and the DC output voltage $V_{out}$. Such a DC-DC converter arrangement incorporating a transformer rather than an inductor commonly is referred to as a "flyback" converter.

In the circuit of FIG. 8, the "secondary side" of the converter portion is arranged such that the converter provides a DC output voltage having the same polarity as the DC input voltage (note the opposing "dot" convention for the windings of the transformer 72, indicating that the primary transformer winding is wound in the opposite direction of the secondary transformer winding). The DC-DC converter portion 69 also includes an isolation element 70 (e.g., a second high-frequency transformer or optoisolator) in the voltage regulation feedback control loop to link the error signal from the error amplifier 28 to the modulator 36 (the error signal input to and output from the isolation element 70 is indicated by the reference numerals 38A and 38B).

In view of the various isolation features in the circuit of FIG. 8, it should be appreciated that power for the oscillator/modulation circuitry generally may be derived from the primary side unregulated higher DC input voltage $V_{in}$, whereas power for other elements of the feedback control loop (e.g., the reference voltage $V_{ref}$, the error amplifier 28) may be derived from the secondary side regulated DC output voltage $V_{out}$. Alternatively, as mentioned above, power for the components of the feedback loop may in some cases be provided by an independent power source.

FIG. 9 is a circuit diagram illustrating yet another example of a power supply 74 incorporating a different type of DC-DC converter that provides input-output isolation. The DC-DC converter portion 75 of the power supply 74 shown in FIG. 9 commonly is referred to as a "forward" converter, and is based on the step-down or "buck" converter discussed above in connection with FIG. 1. In particular, the converter portion 75 again includes a transformer 72 like the circuit of FIG. 8, but also includes a secondary, side inductor 76 and additional diode 77 (D2) not present in the flyback converter shown in FIG. 8 (note that the diode D2, the inductor 76 and the capacitor 34 resemble the buck converter configuration illustrated in FIG. 1). In the forward converter, the diode D1 ensures that only positive transformer secondary voltages are applied to the output circuit while D2 provides a circulating path for current in the inductor 76 when the transformer voltage is zero or negative.

Other well-known modifications may be made to the forward converter shown in FIG. 9 to facilitate "full-wave" conduction in the secondary circuit. Also, while not indicated explicitly in the figures, both of the exemplary power supplies shown in FIGS. 8 and 9 may be modified to incorporate current-mode features as discussed above in connection with FIG. 7 (i.e., to limit the current in the primary winding of the transformer 72).

Although the circuits of FIGS. 8 and 9 include two isolation elements (e.g., the transformer 72 and the isolation element 70) as opposed to a single 60 Hz power transformer as in a linear power supply, the difference in size and weight between a switching power supply and a linear power supply is significant; the size of a transformer generally is determined by the core size, which decreases dramatically at the higher switching frequencies of the switching supply (on the order of 50 kHz to 100 kHz) as opposed to the line frequency (60 Hz). Also, switching supplies operate at significantly cooler temperatures as a result of their increased efficiency and lower heat dissipation as compared to linear supplies. As a result, switching power supplies are commonly utilized for many consumer electronics applications (e.g., computers and other electronic instruments and devices).

Examples of commercial switching power supply packages include small modular units, wall plug-ins, open-framed units, or enclosed units. Small modular units generally are used in moderately low-power applications from approximately 10 to 25 Watts. Wall plug-in supplies typically provide even less power, while open-framed or enclosed units may be configured to supply substantially more power (e.g., 500 to 1000 Watts or more). Examples of common regulated DC output voltages from commercially available switching power supplies include ±5V, ±12V, ±15V, and 24V.

Because of the switching nature of DC-DC converters, these apparatus generally draw current from a power source in short pulses (e.g., see $I_{in}$ FIG. 2). This condition may have some generally undesirable effects when DC-DC converters draw power from an AC power source (e.g., as in the arrangements of FIGS. 8 and 9).

In particular, for maximum power efficiency from an AC power source, the input current ultimately drawn from the AC line voltage ideally should have a sinusoidal wave shape and be in phase with the AC line voltage. This situation commonly is referred to as "unity power factor," and generally results with purely resistive loads. The switching nature of the DC-DC converter and resulting pulsed current draw (i.e., significantly non-sinusoidal current draw), however, causes these apparatus to have less than unity power factor, and thus less than optimum power efficiency (notwithstanding their improved efficiency over conventional linear supplies).

More specifically, the "apparent power" drawn from an AC power source by a load that is not a purely resistive load (i.e., a switching power supply drawing power from an AC line voltage) is given by multiplying the RMS voltage applied to the load and the RMS current drawn by the load. This apparent power reflects how much power the device appears to be drawings from the source. However, the actual power drawn by the load may be less than the apparent power, and the ratio of actual to apparent power is referred to as the load's "power factor" (the power factor traditionally is given by the cosine of the phase angle between applied voltage and current drawn). For example, a device that draws an apparent power of 100 Volt-amps and has a 0.5 power factor actually consumes 50 Watts of power, not 100 Watts; stated differently, in this example, a device with a 0.5 power factor appears to require twice as much power from the source than it actually consumes.

As mentioned above, conventional DC-DC converters characteristically have significantly less than unity power factor due to their switching nature and pulsed current draw. Additionally, if the DC-DC converter were to draw current from the AC line voltage with only intervening rectification and filtering, the pulsed non-sinusoidal current drawn by the DC-DC converter would place unusual stresses and introduce generally undesirable noise and harmonics on the AC line voltage (which may adversely affect the operation of other devices drawing power from the AC line voltage).

In view of the foregoing, some conventional switching power supplies are equipped with, or used in conjunction with, power factor correction apparatus that are configured to address the issues noted above and provide for a more efficient provision of power from an AC power source. In particular, such power factor correction apparatus generally operate to "smooth out" the pulsed current drawn by a DC-DC converter, thereby lowering its RMS value, reducing undesirable harmonics, improving the power factor, and reducing the chances of an AC mains circuit breaker tripping due to peak currents.

In some conventional arrangements, a power factor correction apparatus is itself a type of switched power converter device, similar in construction to the various DC-DC converters discussed above, and disposed for example between an AC bridge rectifier and a DC-DC converter that ultimately provides power to a load. This type of power factor correction apparatus acts to precisely control its input current on an instantaneous basis so as to substantially match the waveform and phase of its input voltage (i.e., a rectified AC line voltage). In particular, the power factor correction apparatus may be configured to monitor a rectified AC line voltage and utilize switching cycles to vary the amplitude of the input current waveform to bring it closer into phase with the rectified line voltage.

FIG. 9A is a circuit diagram generally illustrating such a conventional power factor correction apparatus 520. As discussed above, the power factor correction apparatus is configured so as to receive as an input 69 the rectified AC line voltage $V_{AC}$ from the bridge rectifier 68, and provide as an output the voltage $V_{in}$ that is then applied to a DC-DC converter portion of a power supply (e.g., with reference to FIGS. 8 and 9, the power factor correction apparatus 520 would be disposed between the bridge rectifier 68 and the DC-DC converter portions 69 and 75, respectively). As can be seen in FIG. 9A, a common example of a power factor correction apparatus 520 is based on a boost converter topology (see FIG. 4 for an example of a DC-DC converter boost configuration) that includes an inductor $L_{PFC}$, a switch $SW_{PFC}$, a diode $D_{PFC}$, and the filter capacitor 35 across which the voltage $V_{in}$ is generated.

The power factor correction apparatus 520 of FIG. 9A also includes a power factor correction (PFC) controller 522 that monitors the rectified voltage $V_{AC}$, the generated voltage $V_{in}$ provided as an output to the DC-DC converter portion, and a signal 71 ($I_{samp}$) representing the current $I_{AC}$ drawn by the apparatus 520. As illustrated in FIG. 9A, the signal $I_{samp}$ may be derived from a current sensing element 526 (e.g., a voltage across a resistor) in the path of the current $I_{AC}$ drawn by the apparatus. Based on these monitored signals, the PFC controller 522 is configured to output a control signal 73 to control the switch 75 ($SW_{PFC}$) such that the current $I_{AC}$ has a waveform that substantially matches, and is in phase with, the rectified voltage $V_{AC}$.

FIG. 9B is a diagram that conceptually illustrates the functionality of the PFC controller 522. Recall that, generally speaking, the function of the power factor correction apparatus 520 as a whole is to make itself look essentially like a resistance to an AC power source; in this manner, the voltage provided by the power source and the current drawn from the power source by the "simulated resistance" of the power factor correction apparatus have essentially the same waveform and are in phase, resulting in substantially unity power factor. Accordingly, a quantity $R_{PFC}$ may be considered as representing a conceptual simulated resistance of the power factor correction apparatus, such that, according to Ohm's law, $$V_{AC}=I_{AC}R_{PFC}$$

or $$G_{PFC}V_{AC}=I_{AC},$$

where $G_{PFC}=1/R_{PFC}$ and represents an effective conductance of the power factor correction apparatus 520.

With the foregoing in mind, the PFC controller 522 shown in FIG. 9B implements a control strategy based on two feedback loops, namely a voltage feedback loop and a current feedback loop. These feedback loops work together to manipulate the instantaneous current $I_{AC}$ drawn by the power factor correction apparatus based on a derived effective conductance $G_{PFC}$ for the power factor correction apparatus. To this end, a voltage feedback loop 524 is implemented by comparing the voltage $V_{in}$ (provided as an output across the filter capacitor 35) to a reference voltage $V_{refPFC}$ representing a desired regulated value for the voltage $V_{in}$. The comparison of these values generates an error voltage signal $V_e$ which is applied to an integrator/low pass filter having a cutoff frequency of approximately 10-20 Hz. This integrator/low pass filter imposes a relatively slow response time for the overall power factor control loop, which facilitates a higher power factor; namely, because the error voltage signal $V_e$ changes slowly compared to the line frequency (which is 50 or 60 Hz), adjustments to $I_{AC}$ due to changes in the voltage $V_{in}$ (e.g., caused by sudden and/or significant load demands) occur over multiple cycles of the line voltage rather than abruptly during any given cycle.

In the controller shown in FIG. 9B, a DC component of the slowly varying output of the integrator/low pass filter essentially represents the effective conductance $G_{PFC}$ of the power factor correction apparatus; hence, the output of the voltage feedback loop 524 provides a signal representing the effective conductance $G_{PFC}$. Accordingly, based on the relationship given above, the PFC controller 522 is configured to multiply this effective conductance by the monitored rectified line voltage $V_{AC}$ to generate a reference current signal $I^*_{AC}$ representing the desired current to be drawn from the line voltage, based on the simulated resistive load of the apparatus 520. This signal $I^*_{AC}$ thus provides a reference or "set-point" input to the current control loop 528.

In particular, as shown in FIG. 9B, in the current control loop 528, the signal $I^*_{AC}$ is compared to the signal $I_{samp}$ which represents the actual current $I_{AC}$ being drawn by the apparatus 520. The comparison of these values generates a current error signal $I_e$ that serves as a control signal for a pulse width modulated (PWM) switch controller (e.g., similar to that discussed above in connection with FIG. 7). The PWM switch controller in turn outputs a signal 73 to control the switch $SW_{PFC}$ so as to manipulate the actual current $I_{AC}$ being drawn (refer again to FIG. 9A). Exemplary frequencies commonly used for the control signal 73 output by the PWM switch controller (and hence for the switch $SW_{PFC}$) are on the order of approximately 100 kHz. With the foregoing in mind, it should be appreciated that it is the resulting average value of a rapidly varying $I_{AC}$ that resembles a sinusoidal waveform, with an approximately 100 kHz ripple resulting from the switching operations. Generally, the current feedback loop and the switch control elements have to have enough bandwidth to follow a full wave rectified waveform, and hence a bandwidth of at least a few kHz is sufficient.

Thus, in the conventional power factor correction schemes outlined in connection with FIGS. 9A and 9B, the power factor correction apparatus 520 provides as an output the regulated voltage $V_{in}$ across the capacitor 35, from which current may be drawn as needed by a load coupled to $V_{in}$ (e.g., by a subsequent DC-DC converter portion of a power supply). For sudden and/or excessive changes in load power requirements, the instantaneous value of the voltage $V_{in}$ may change dramatically; for example, in instances of sudden high load power requirements, energy reserves in the capacitor are drawn upon and $V_{in}$ may suddenly fall below the reference $V_{refPFC}$. As a result, the voltage feedback loop 524, with a relatively slow response time, attempts to adjust $V_{in}$ by causing the power factor correction apparatus to draw more current from the line voltage. Due to the relatively slow response time, though, this action may in turn cause an over-voltage condition for $V_{in}$, particularly if the sudden/excessive demand from the load no longer exists by the time an adjustment to $V_{in}$ is made. The apparatus then tries to compensate for the over-voltage condition, again subject to the slow response time of the voltage feedback loop 524, leading to some degree of potential instability. Similar sudden changes (either under- or over-voltage conditions) to $V_{in}$ may result from sudden/excessive perturbations on the line voltage 67, to which the apparatus 520 attempts to respond in the manner described above.

From the foregoing, it should be appreciated that the slow response time that on the one hand facilitates power factor correction at the same time may result in a less than optimum input/output transient response capability. Accordingly, the voltage feedback loop response time/bandwidth in conventional power factor correction apparatus generally is selected to provide a practical balance between reasonable (but less than optimal) power factor correction and reasonable (but less than optimal) transient response.

In some switching power supply applications, a power factor correction apparatus may not be required or even significantly effective. For example, for small loads that draw relatively low power from a power source, the power factor of the switching power supply conventionally is considered to be not as important as in higher power applications; presumably, the power drawn by a small load comprises a relatively insignificant portion of the overall power available on a particular AC power circuit. In contrast, power factor correction generally is considered important for larger loads consuming relatively higher power, in which the input current to the switching power supply may approach the maximum available from the AC power source.

In sum, it should be appreciated that the foregoing discussion in connection with FIGS. 9A and 9B is primarily conceptual in nature to provide a general understanding of the power factor correction functionality. In practice, integrated circuit power factor correction controllers presently are available from various sources (e.g., Fairchild Semiconductor ML4821 PFC Controller, ST Microelectronics L6561). In particular, the ST Microelectronics L6561 controller is configured to facilitate power factor correction based on a boost converter topology (see FIG. 4 for an example of a DC-DC converter boost configuration). The L6561 controller utilizes a "transition mode" (TM) technique (i.e., operating around a boundary between continuous and discontinuous modes) commonly employed for power factor correction in relatively low power applications. Details of the L6561 controller and the transition mode technique are discussed in ST Microelectronics Application Note AN966, "L6561 Enhanced Transition Mode Power Factor Corrector," by Claudio Adragna, March 2003, available at http://www.st.com and incorporated herein by reference.

In addition to facilitating power factor correction, the ST Microelectronics L6561 controller may be alternatively employed in a "non-standard" configuration as a controller in a flyback DC-DC converter implementation. In particular, with reference again to FIG. 8, the L6561 may be used to accomplish the general functionality of the PWM controller 36 that controls the transistor switch 20. Details of this and related alternative applications of the L6561 controller are discussed in ST Microelectronics Application Note AN1060, "Flyback Converters with the L6561 PFC Controller," by C. Adragna and G. Garravarik, January 2003, ST Microelectronics Application Note AN1059, "Design Equations of High-Power-Factor Flyback Converters based on the L6561," by Claudio Adragna, September 2003, and ST Microelectronics Application Note AN1007, "L6561-based Switcher Replaces Mag Amps in Silver Boxes," by Claudio Adragna, October 2003, each of which is available at http://www.st.com and incorporated herein by reference.

Specifically, Application Notes AN1059 and AN1060 discuss one exemplary configuration for an L6561-based flyback converter (High-PF flyback configuration) that operates in transition mode and exploits the aptitude of the L6561 controller for performing power factor correction, thereby providing a high power factor single switching stage DC-DC converter for relatively low load power requirements (e.g., up to approximately 30 Watts). FIG. 10 illustrates this configuration (which is reproduced from FIG. 1c of Application Note AN1059). As discussed in the above-referenced application notes, some common examples of applications for which the flyback converter configuration of FIG. 10 may be useful include low power switching power supplies, AC-DC adapters for mobile or office equipment, and off-line battery chargers, all of which are configured to provide power to generally predictable and relatively stable (fixed) loads.

SUMMARY

Applicants have recognized and appreciated that employing a single-switching stage high power factor DC-DC converter (similar to that shown in FIG. 10) in power supplies for relatively low power lighting apparatus (e.g., approximately 10-50 Watts) may provide noteworthy advantages in lighting systems employing a significant number of such apparatus.

In particular, although the power factor of a given low power lighting apparatus may not be significant in and of itself with respect to the current-handling capability of an overall circuit from which the apparatus may draw power (e.g., a 15-20 Amp A.C. circuit at a conventional U.S. or European line voltage), the power factor of such devices becomes more of an issue when several such apparatus are placed on the same A.C. circuit. Specifically, the higher the power factor of the individual low power lighting apparatus, the greater the number of such apparatus that may be safely and reasonably placed on the same power circuit. Accordingly, more complex lighting system installations may be implemented with greater numbers of high power factor, relatively low power, lighting apparatus.

In view of the foregoing, the high power factor flyback converter arrangement of FIG. 10 provides a potentially attractive candidate for use in a power source for a low power lighting apparatus. Amongst the attractive attributes of such a supply are a relatively low size and parts count, in that only a single switching stage is required (i.e., a separate power factor correction apparatus is not required in addition to a DC-DC converter stage) to provide a high power factor.

However, Applicants have identified a number of shortcomings with high power factor single-stage switching power supplies and, in particular, the configuration shown in FIG. 10.

First, if load conditions change such that power to the load varies significantly over a relatively short period of time (e.g., if the load goes from some maximum power draw level or "fill on" to essentially "full off"), the feedback loop (including the OPTO+TL431 in FIG. 10) may not be able to react quickly enough to the sudden change in load conditions. In particular, with a sudden near zero or zero load power demand, the converter output provides an "overvoltage" output condition (a higher than desired output voltage), in response to which the feedback loop instructs the controller 36A to significantly reduce the switching duty cycle, or stop switching altogether. In this instance, power to the controller itself (which is derived from a winding of the transformer 72) may drop dramatically, causing an undervoltage condition for the controller that results in the controller entering an "auto restart" mode. If at this point there is a sudden demand for load power (i.e., the load is turned "full on" again), the output capacitor 34 is required to supply the immediate demand for power, and accordingly discharges quickly, resulting in an undesirable "power glitch" to the load while the controller 36 attempts to recover and begin switching action again.

Second, single switching stage high power factor converters as exemplified by the circuit of FIG. 10 require some minimum load for the controller to function properly (this is in part related to the problem discussed immediately above). In particular, the ST L6561 controller includes a feature that essentially shuts down the controller when the load current drops below some minimum threshold. Accordingly, this feature precludes reliable operation for loads that may be significantly variable (e.g., loads that may vary between an on and an off state during normal operation, such as lighting apparatus).

Thus, Applicants have recognized and appreciated that, for relatively low load powers or near zero loads (during which the converter switches to a fully discontinuous mode), high power factor DC-DC converter circuits such as the circuit of FIG. 10 generally suffer from notably poor load regulation, in which long periods of no switching activity are followed by short "bursts" of high switching activity, leading to unpredictable and unstable power delivery.

In view of the foregoing, one embodiment of the present disclosure is directed to modifications to a switching power supply to include a processor-controlled dummy load in addition to an actual load, so as to improve power delivery for a highly variable load, and especially a near zero load. In one aspect of this embodiment, a high power factor single switching stage DC-DC converter based power supply provides power to both an actual load and the processor-controlled dummy load, such that the DC-DC converter always "sees" some minimum load. In another aspect, the amount of power dissipated in the dummy load generally may be determined by software executed by the processor so as to compensate for various undesirable activity of the power supply's feedback loop (e.g., slow response time of the feedback loop). In other aspects, the dummy load may have some fixed or variable value that is switched in below some fixed or variable low power condition threshold.

Applicants also have recognized and appreciated that in some DC-DC converter configurations, including the configuration shown in FIG. 10, an undesirably high level of electromagnetic interference (EMI) may be generated especially at low load powers. This situation is due at least in part to the fact that for relatively low load powers, the converter of FIG. 10 operates in discontinuous mode (i.e., the input current to the DC-DC converter is discontinuous). Accordingly, another embodiment of the disclosure is directed to modifications to a switching power supply which significantly reduce electromagnetic interference that may be generated during the provision of power to a load. In one aspect of this embodiment, a modified switching power supply includes optimized filtering components that increase noise rejection, especially undesirable noise that may be generated during discontinuous mode operation of the power supply. In yet another aspect, an operating frequency of the switching power supply is optimized to reduce electromagnetic interference.

As discussed above, Applicants have also recognized and appreciated that various DC-DC configurations, including configurations based on the high power factor flyback converter configuration shown in FIG. 10, may be effectively employed in a relatively low power switching power supply for loads that include lighting apparatus and, in particular, LED-based lighting apparatus. Accordingly, another embodiment of the present disclosure is directed to an LED-based lighting system employing a high power factor switching power supply based on a flyback converter configuration, in which the power supply is configured to provide variable power to a load that includes an LED-based lighting apparatus. In various aspects of this embodiment, the power supply is particularly configured so as to provide stable and accurately controllable power, especially at low load powers and near zero load power, and to reduce undesirable EMI.

In sum, one embodiment of the present disclosure is directed to an apparatus, comprising a switching power supply configured to provide power factor correction and an output voltage to a load via control of a single switch, wherein the apparatus is configured to mitigate a significant overvoltage condition in the output voltage as a result of a zero or near-zero power drawn by the load.

Another embodiment of the present disclosure is directed to a method, comprising acts of providing power factor correction and an output voltage to a load via control of a single switch, and mitigating a significant overvoltage condition in the output voltage as a result of a zero or near-zero power drawn by the load.

Another embodiment of the present disclosure is directed to a lighting apparatus, comprising at least one LED-based light source, and a switching power supply configured to provide power factor correction and a supply voltage to the at least one LED-based light source via control of a single switch, wherein the apparatus is configured to mitigate a significant overvoltage condition in the supply voltage as a result of a zero or near-zero power drawn by the at least one LED-based light source.

It should be appreciated that all combinations of the foregoing concepts and additional concepts discussed in greater detail below are contemplated as being part of the inventive subject matter disclosed herein.

DETAILED DESCRIPTION

As discussed above, various embodiments of the present disclosure are directed to methods, apparatus and systems in which power is supplied to a load via a switching power supply, wherein variable power may be provided to the load in an accurately controllable manner, especially at relatively lower load powers, and wherein electromagnetic interference generated by the power supply is significantly reduced. Of particular interest in some embodiments are high power factor single switching stage DC-DC converters for relatively low power applications (e.g., up to approximately 10-50 Watts).

In some embodiments of the present disclosure, also of particular interest are loads that may vary significantly, in which one or more functional components of the load are controlled by modulating power to the functional components. Examples of such functional components may include, but are not limited to, motors or other actuators and motorized/movable components, temperature control components (e.g. heating/cooling elements) and at least some types of light sources. Examples of power modulation control techniques that may be employed in the load to control the functional components include, but are not limited to, pulse frequency modulation, pulse width modulation, pulse number modulation (e.g., one-bit D/A conversion).

More specifically, one type of load of interest in some embodiments of the present disclosure is a lighting apparatus including one or more light-emitting diode (LED) light sources whose perceived brightness may be varied based on modulated pulsed power delivery. To facilitate a discussion of improved power control methods and apparatus according to various embodiments of the present disclosure using the example of a lighting apparatus/load, it is instructive to first discuss an exemplary conventional arrangement in which a switching power supply including a DC-DC converter provides power via a regulated DC output voltage to such an LED-based lighting apparatus.

Figure 11:
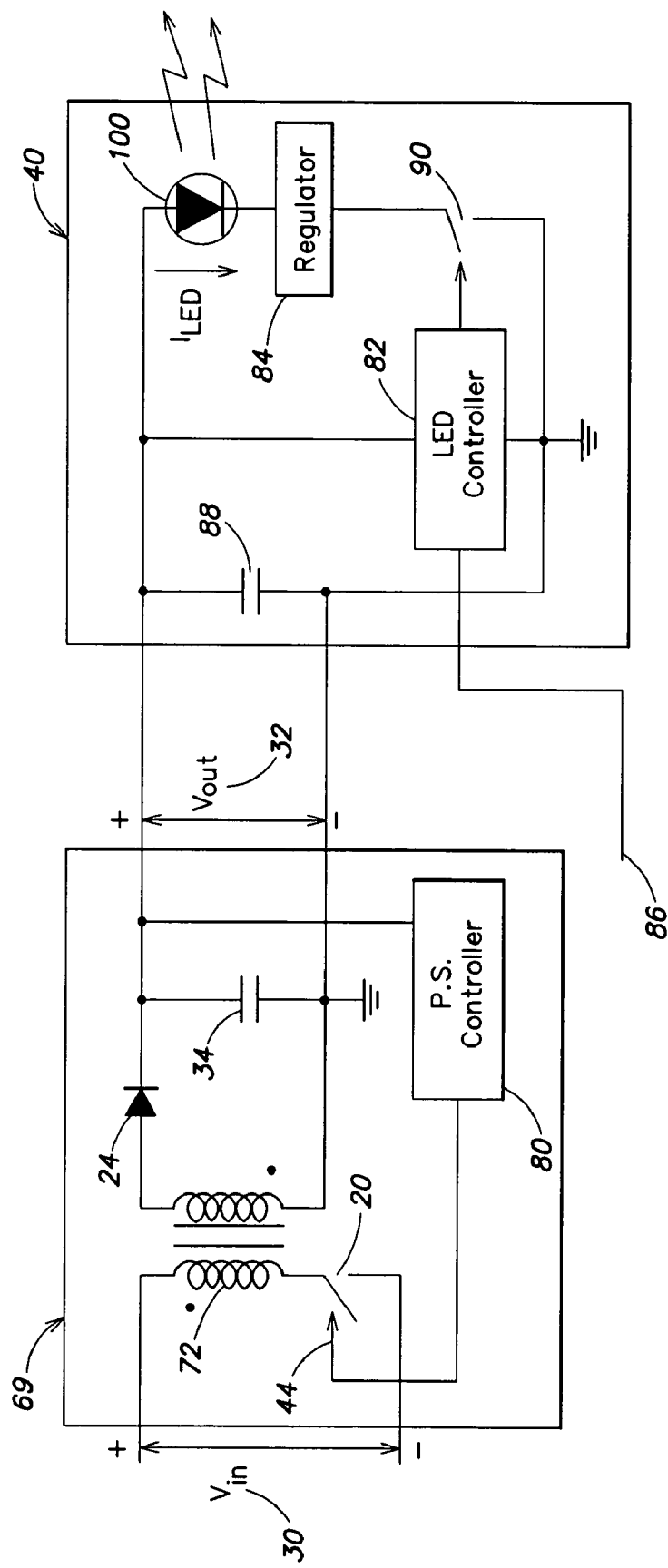
FIG. 11 is a diagram schematically showing an exemplary conventional arrangement of a DC-DC converter coupled to a load that is configured to modulate power delivered to one or more functional components of the load.

FIG. 11 is a diagram illustrating such an exemplary conventional arrangement of a DC-DC converter 69 and an LED-based lighting apparatus serving as a load 40. As illustrated in FIG. 11, the lighting apparatus includes one or more LEDs 100 and various other components configured to control the intensity of radiation generated by the LED(s). One example of such an apparatus is described in U.S. Pat. No. 6,016,038, issued Jan. 18, 2000, entitled "Multicolored LED Lighting Method and Apparatus," which patent hereby is incorporated herein by reference.

Figure 8:
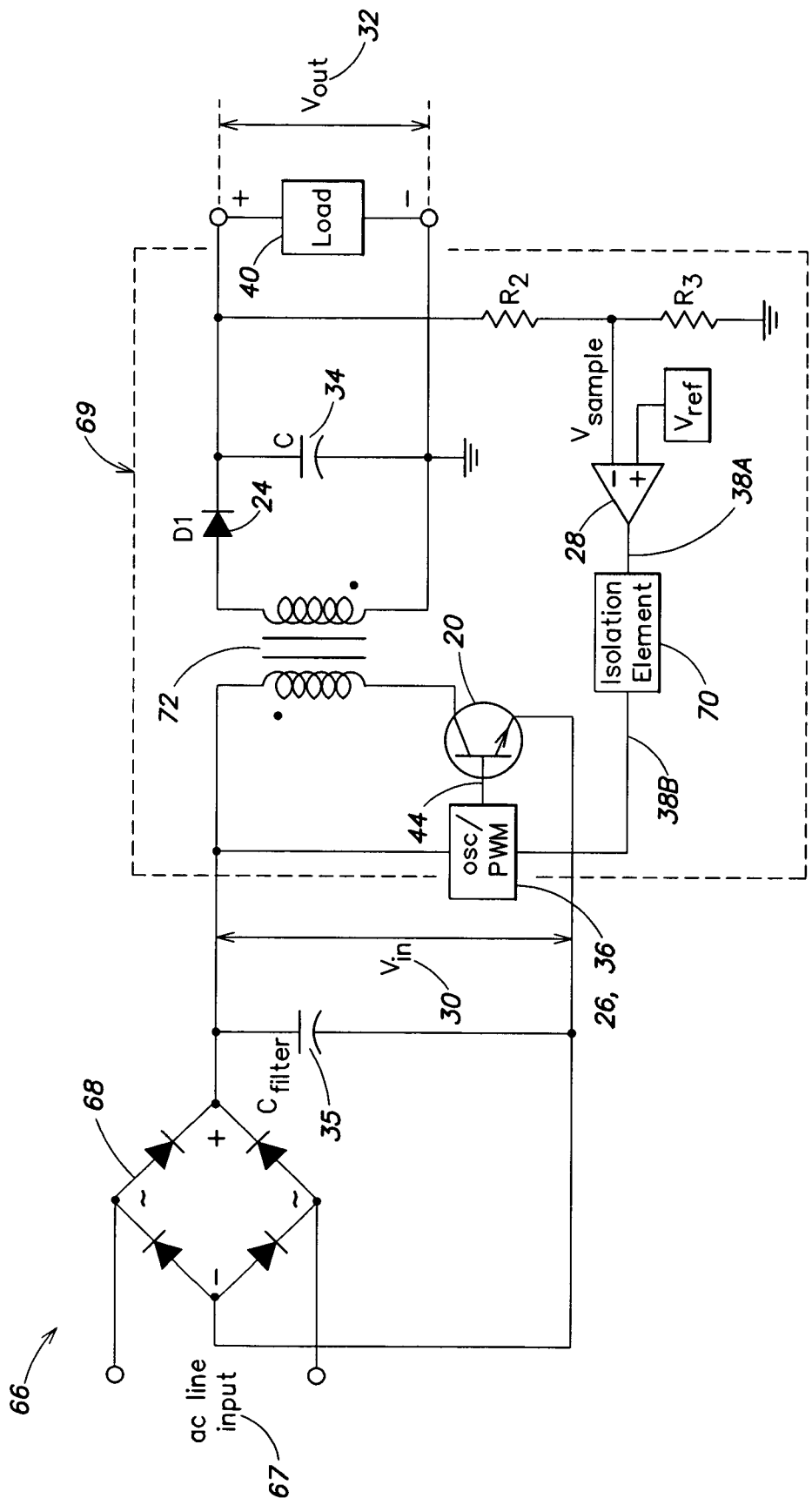
FIG. 8 is a circuit diagram of a conventional "flyback" type DC-DC converter.
Figure 9:
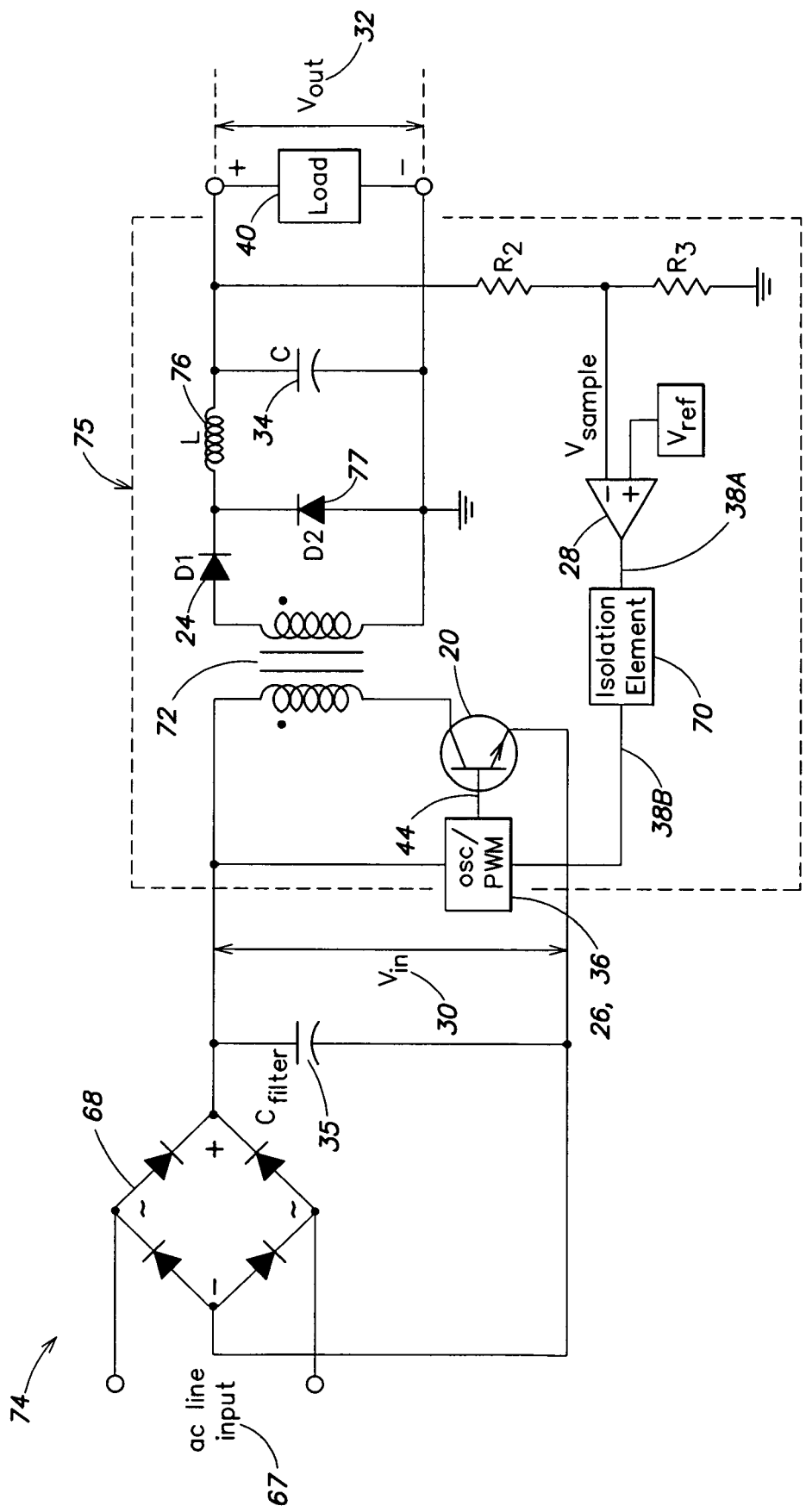
FIG. 9 is a circuit diagram of a conventional "forward" type DC-DC converter.
Figure 9A:
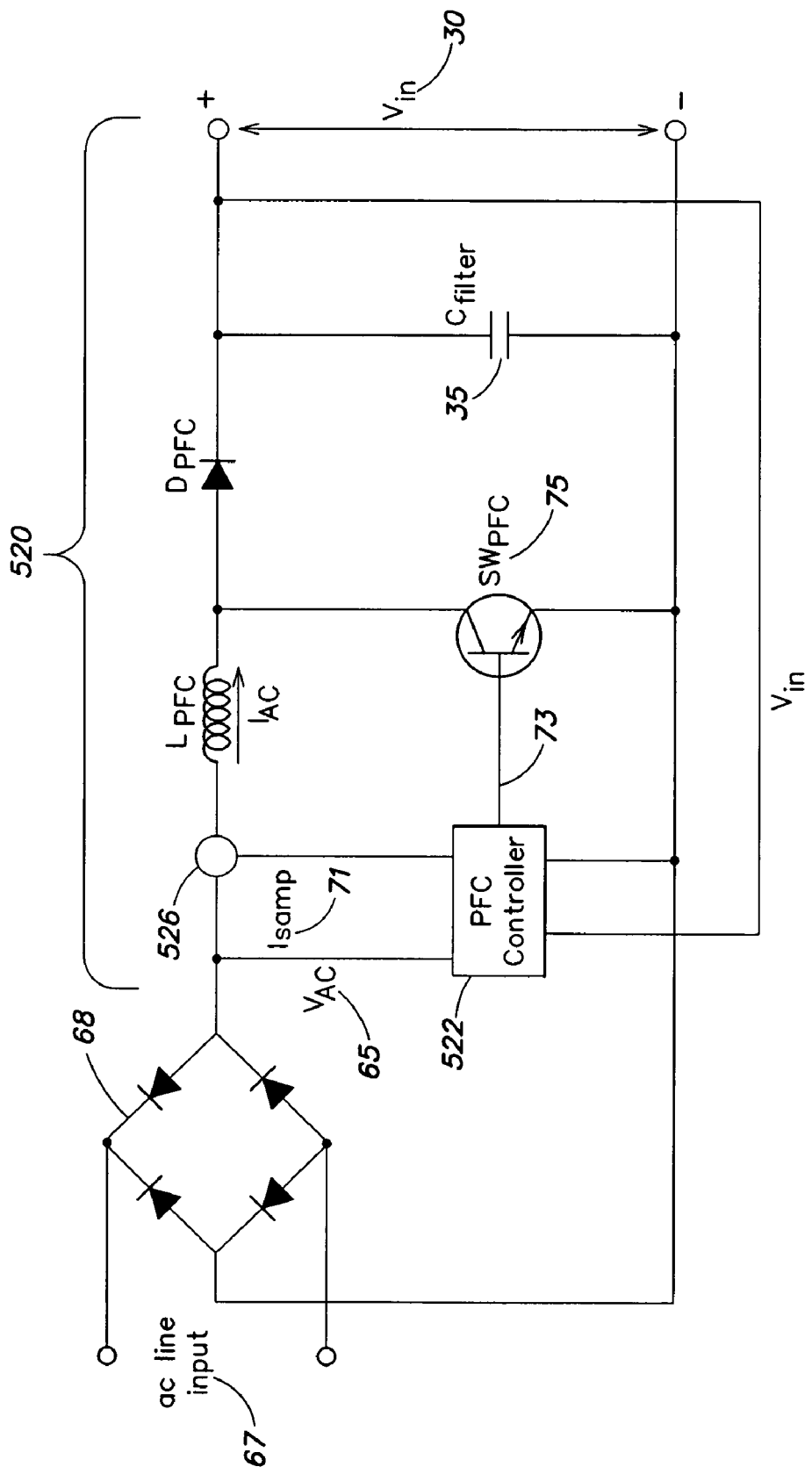
FIG. 9A is a circuit diagram of a conventional power factor correction apparatus based on a boost converter topology.
Figure 9B:
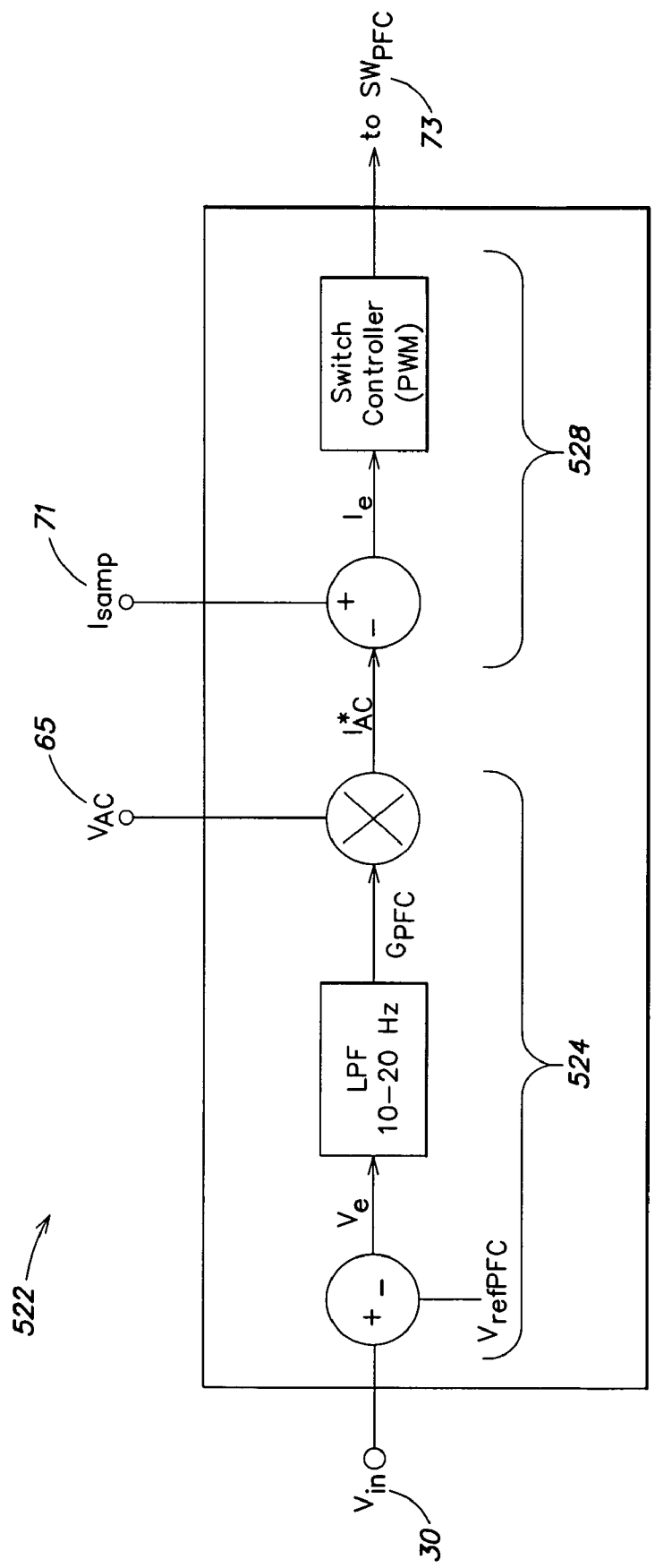
FIG. 9B is a diagram that conceptually illustrates the functionality of a power factor correction controller of the power factor correction apparatus shown in FIG. 9A.

For purposes of the present discussion, the DC-DC converter 69 of FIG. 11 is shown as a flyback regulator (discussed above in connection with FIGS. 8 and 10), and serves as a portion of a power supply which draws power from an A.C. power source (i.e., an A.C. line voltage such as 120 $V_{rms}$/60 Hz). Accordingly, the DC-DC converter 69 includes a transformer 72 and other components to provide appropriate isolation between the unregulated DC input voltage 30 ($V_{in}$) which is derived from the A.C. line voltage, and the regulated DC output voltage 32 ($V_{out}$). It should be appreciated that the forward converter of FIG. 9, as well as other DC-DC converter configurations including input-output isolation features, likewise could be employed in conventional arrangements similar to that illustrated in FIG. 11.

Figure 1:
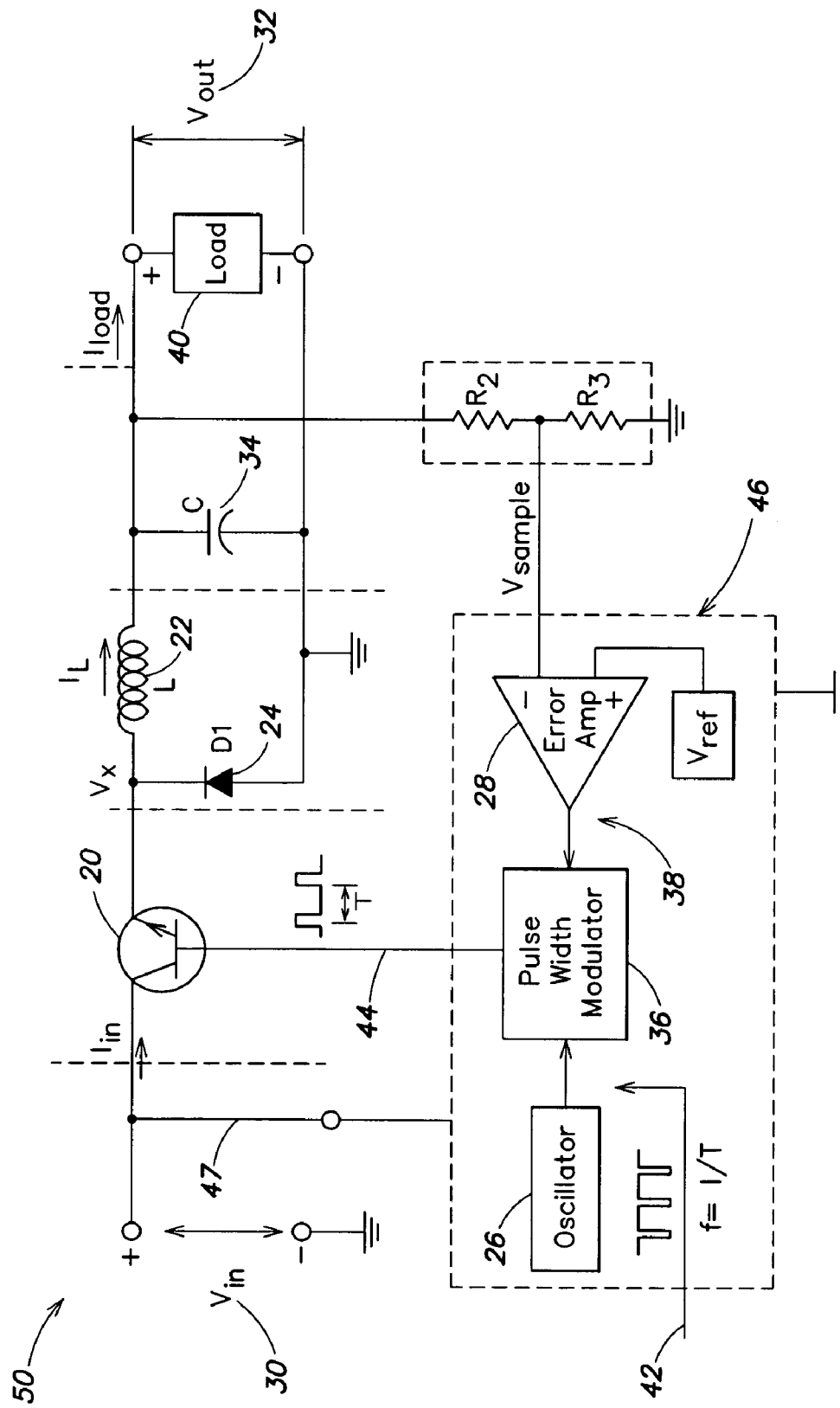
FIG. 1 is a circuit diagram of a conventional step-down or "buck" type DC-DC converter.
Figure 2:
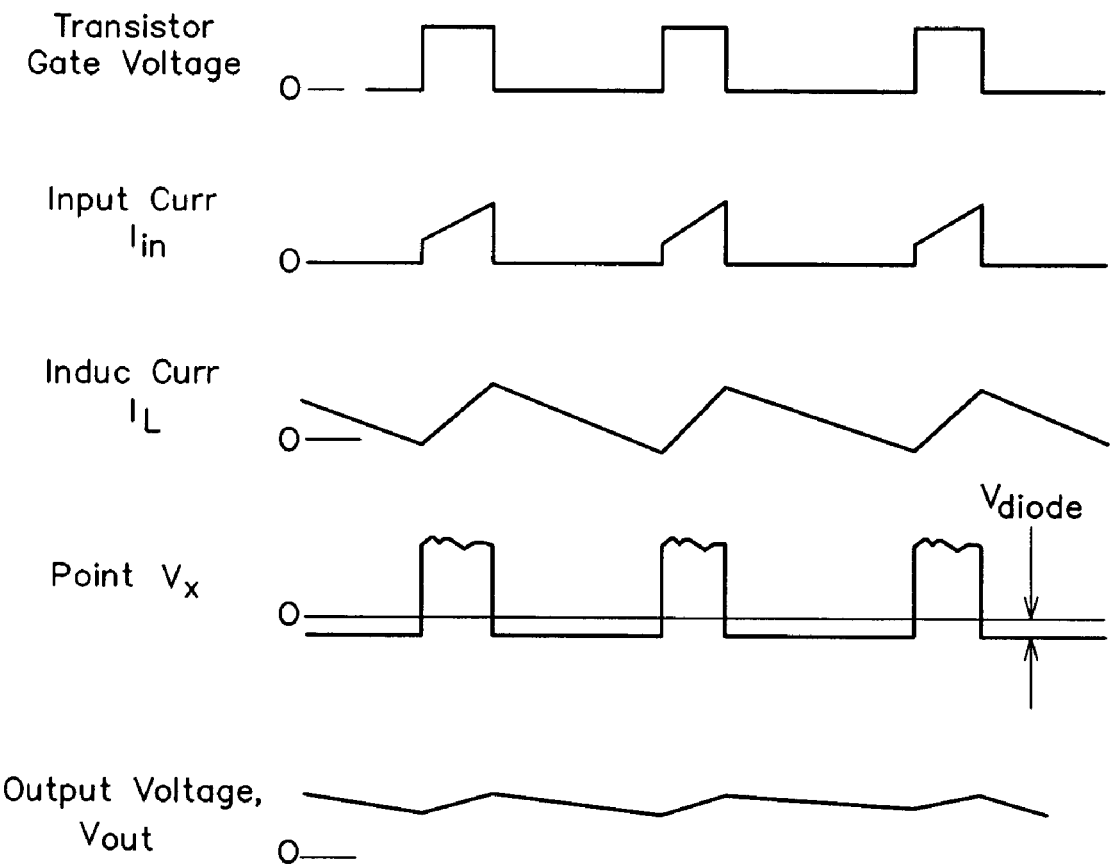
FIG. 2 is a diagram illustrating various operating signals associated with the DC-DC converter of FIG. 1.
Figure 3:
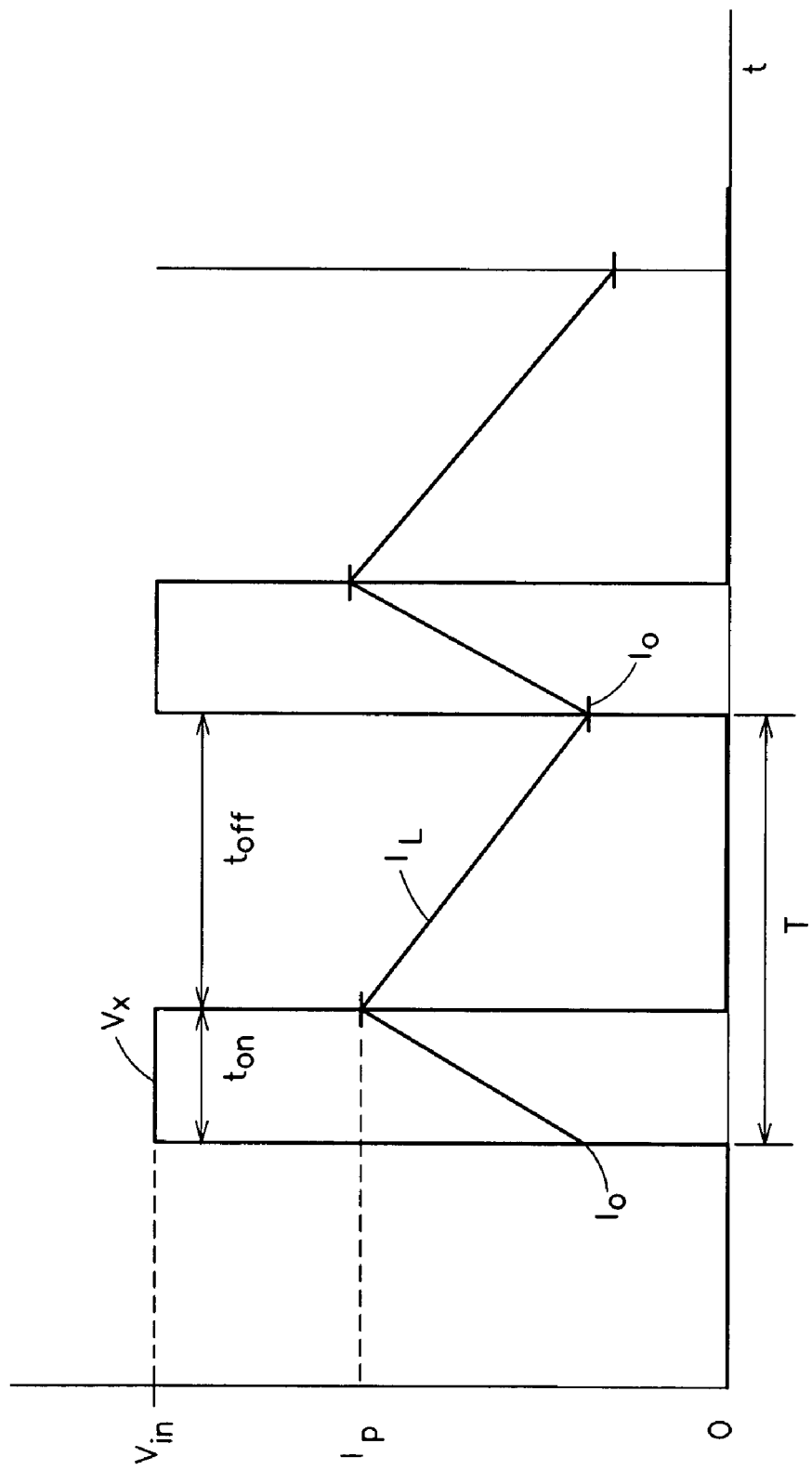
FIG. 3 is a diagram particularly illustrating inductor current vs. applied voltage during two consecutive switching operations in the converter of FIG. 1.
Figure 4:
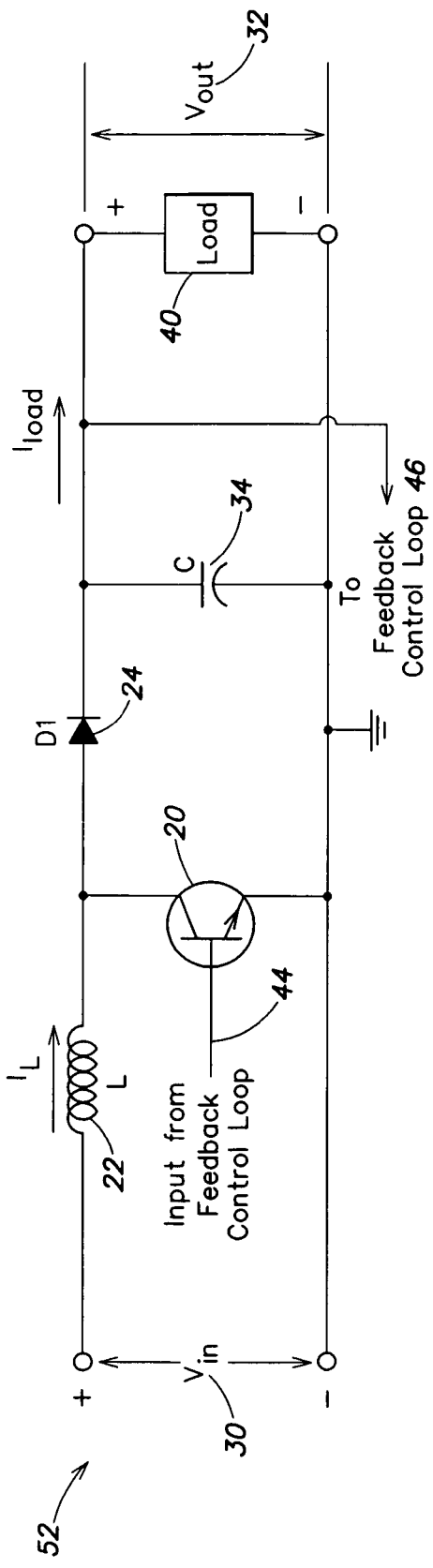
FIG. 4 is a circuit diagram of a conventional step-up or "boost" type DC-DC converter.
Figure 5:
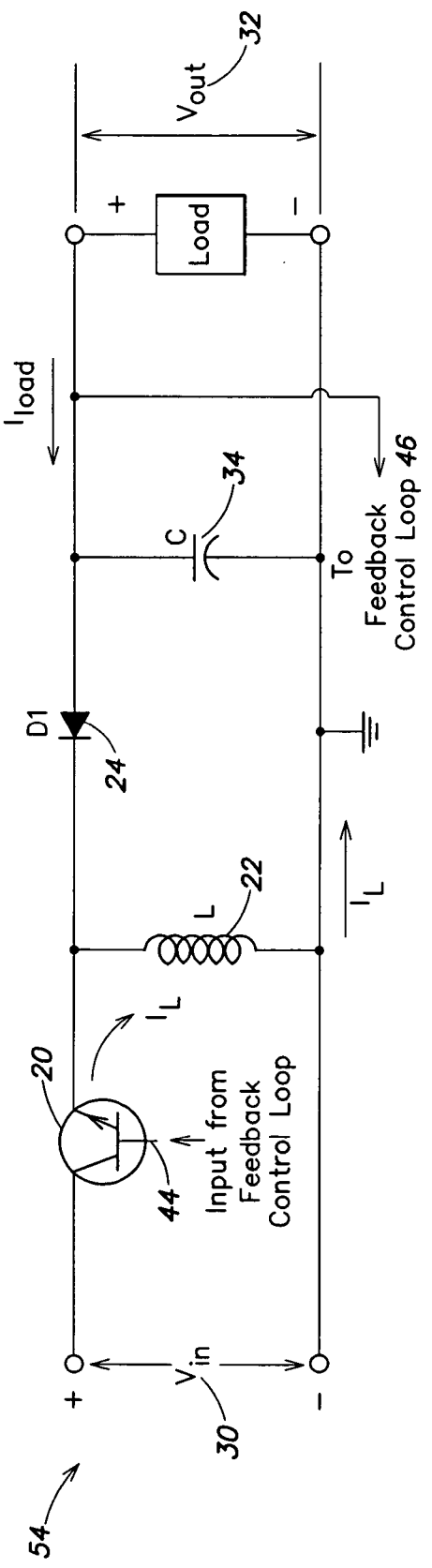
FIG. 5 is a circuit diagram of a conventional inverting or "buck-boost" type DC-DC converter.
Figure 6:
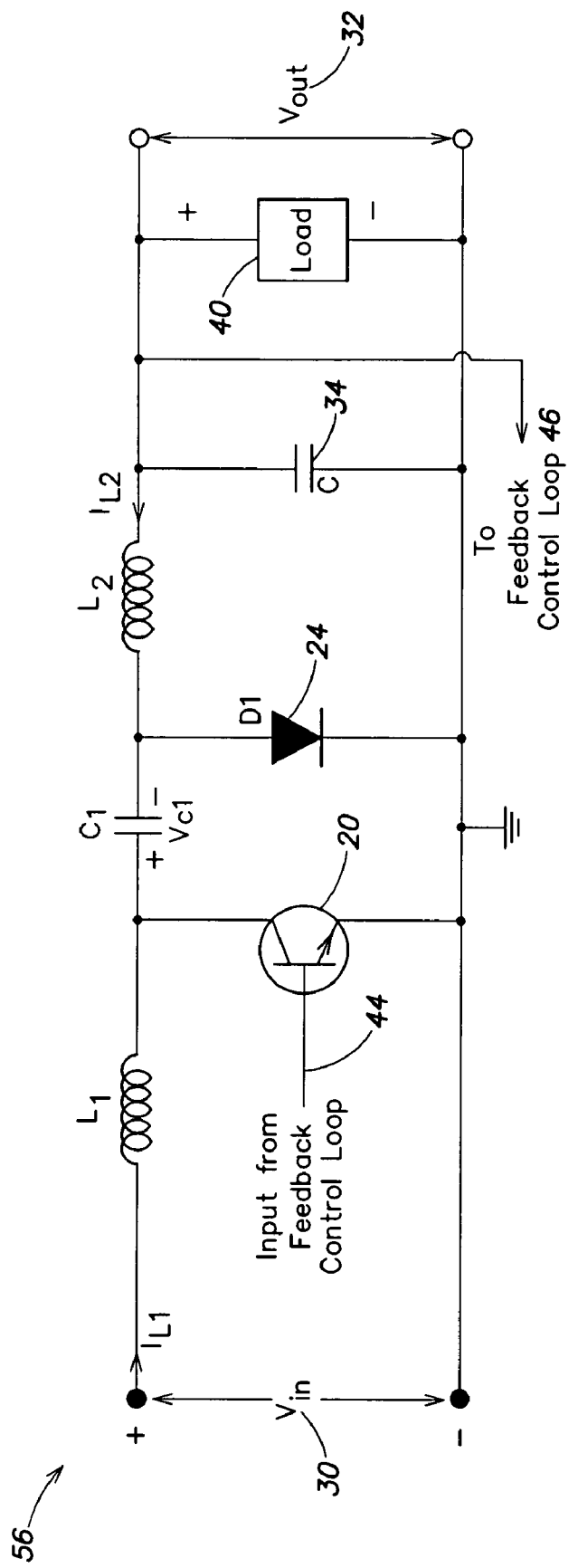
FIG. 6 is a circuit diagram of a conventional "CUK" type DC-DC converter.
Figure 7:
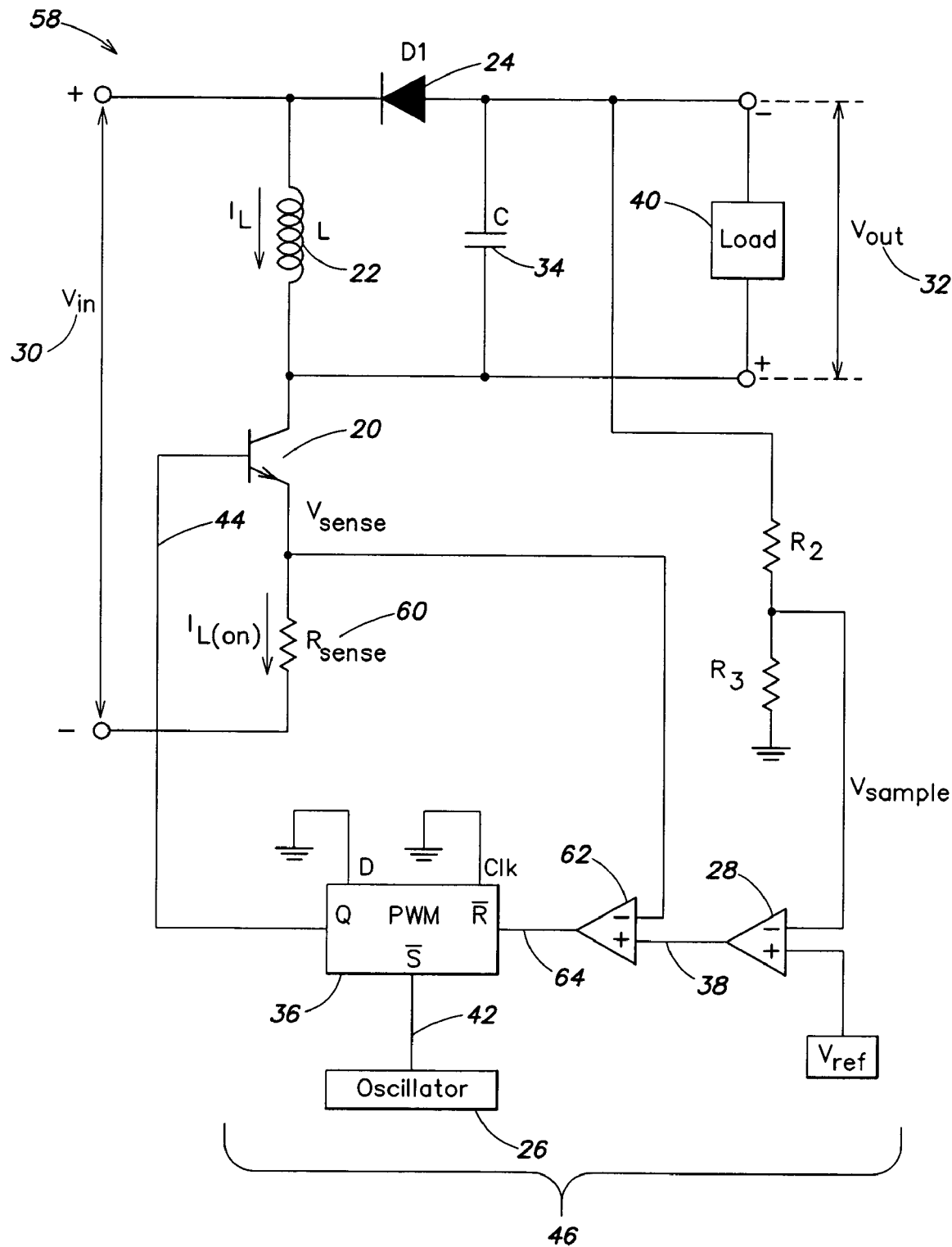
FIG. 7 is a circuit diagram of a buck-boost converter similar to that shown in FIG. 5, configured for current-mode operation.

In FIG. 11, the switch 20 of the DC-DC converter 69 is shown generically as a controllable "make-brake" circuit connection to indicate that various components may be utilized to implement the function of the switch 20 (e.g., BJTs, FETs, as well as other signal amplifier/switch driver circuitry that may be required). Additionally, the components of the converter's voltage regulation feedback loop (refer to FIGS. 1, 7, 10) are indicated collectively in FIG. 11 as a power supply controller 80, which receives as an input a sample of the DC output voltage $V_{out}$ and provides as an output the control signal 44 that operates the switch 20. As discussed above in connection with FIGS. 1 and 7, the components of the power supply controller 80 are configured to vary the duty cycle of the control signal 44 (and hence the on-off operation of the switch 20) so as to adjust the amount of energy transferred across the transformer in a given time period, thereby making adjustments to $V_{out}$ so that it is regulated at an essentially constant predetermined output voltage level.

The lighting apparatus serving as the load 40 in the exemplary arrangement of FIG. 11 includes one or more LEDs 100 controlled by an LED controller 82. Although only one LED 100 is depicted in FIG. 11 for simplicity, it should be appreciated that the apparatus may include multiple LEDs which may be interconnected in any of a variety of serial, parallel, or serial-parallel arrangements such that the converter's regulated supply voltage $V_{out}$ provides an appropriate voltage to drive the LEDs (an LED typically has a low forward voltage on the order of 2 to 4 Volts, and multiple LEDs may be connected in serial/parallel arrangements such that a more commonly available supply output voltage $V_{out}$, such as 12 Volts or 24 Volts, may be applied to the LED arrangement without damaging the LEDs). In the arrangement of FIG. 11, the unregulated DC input voltage $V_{in}$ provided to the DC-DC converter 69 may be on the order of approximately 160 Volts or even significantly higher, and the converter may be configured to provide a regulated DC output or supply voltage $V_{out}$, of 12 Volts or 24 Volts, for example. As indicated in FIG. 11, a common anode of the one or more LEDs 100 may be connected to the positive terminal of the regulated supply voltage $V_{out}$. The load 40 also may include one or more filter capacitors 88 to filter any residual ripple on the supply voltage $V_{out}$.

In the lighting apparatus/load 40 shown in FIG. 11, the intensity of radiation generated by the one or more LEDs 100 is proportional to the average power delivered to the LED(s) over a given time period. Accordingly, one technique for varying the intensity of radiation generated by the one or more LEDs involves modulating the power delivered to the LED(s). To this end, the lighting apparatus also includes a current regulator 84 and a switch 90 in the current path of the LEDs between +$V_{out}$ and ground, as well as an LED controller 82 (which also may be powered via the regulated supply voltage $V_{out}$).

The regulator 84 of the lighting apparatus/load 40 shown in FIG. 11 generally is configured to define the maximum current $I_{LED}$ through the one or more LEDs 100 when the switch 90 is closed so as to complete the current path. Hence, given the fixed supply voltage $V_{out}$ (and hence a fixed voltage $V_{LED}$ across the LED(s) when energized), the regulated current $I_{LED}$ also determines the amount of instantaneous power $P_{LED}$ delivered to the LED(s) when they are energized ($P_{LED}=V_{LED} \cdot I_{LED}$).

In the exemplary arrangement of FIG. 11, the LED controller 82 may be configured to control the switch 90 using a pulse width modulation technique so as to modulate the average power delivered to the LED(s) over time. In particular, the LED controller is configured to repeatedly open and close the switch 90, thereby energizing the one or more LEDs in a pulsed fashion, preferably at a frequency that is greater than that capable of being detected by the human eye (e.g., greater than approximately 100 Hz). In this manner, an observer of the light generated by the LED(s) does not perceive discrete on and off cycles (commonly referred to as a "flicker effect"), but instead the integrating function of the eye perceives essentially continuous illumination. By adjusting the average amount of time the LED(s) are energized in any given time period (i.e., by adjusting the average power delivered to the LED(s)), the perceived brightness of the generated light may be varied. The LED controller 82 may accomplish this by adjusting the duty cycle of the switch 90 (i.e., by increasing or decreasing the time the switch is on or closed during successive switching cycles). As shown in FIG. 11, the LED controller 82 may receive a control signal or control data 86 which specifies the switch's duty cycle at any given time, and hence the perceived brightness of observed light. In some implementations, the control data 86 may include two-way data transfer, i.e., the controller 82 may receive data relating to the duty cycle and other operating functions, and may also transmit data regarding the status of control, handshaking information, etc.

Figure 12:
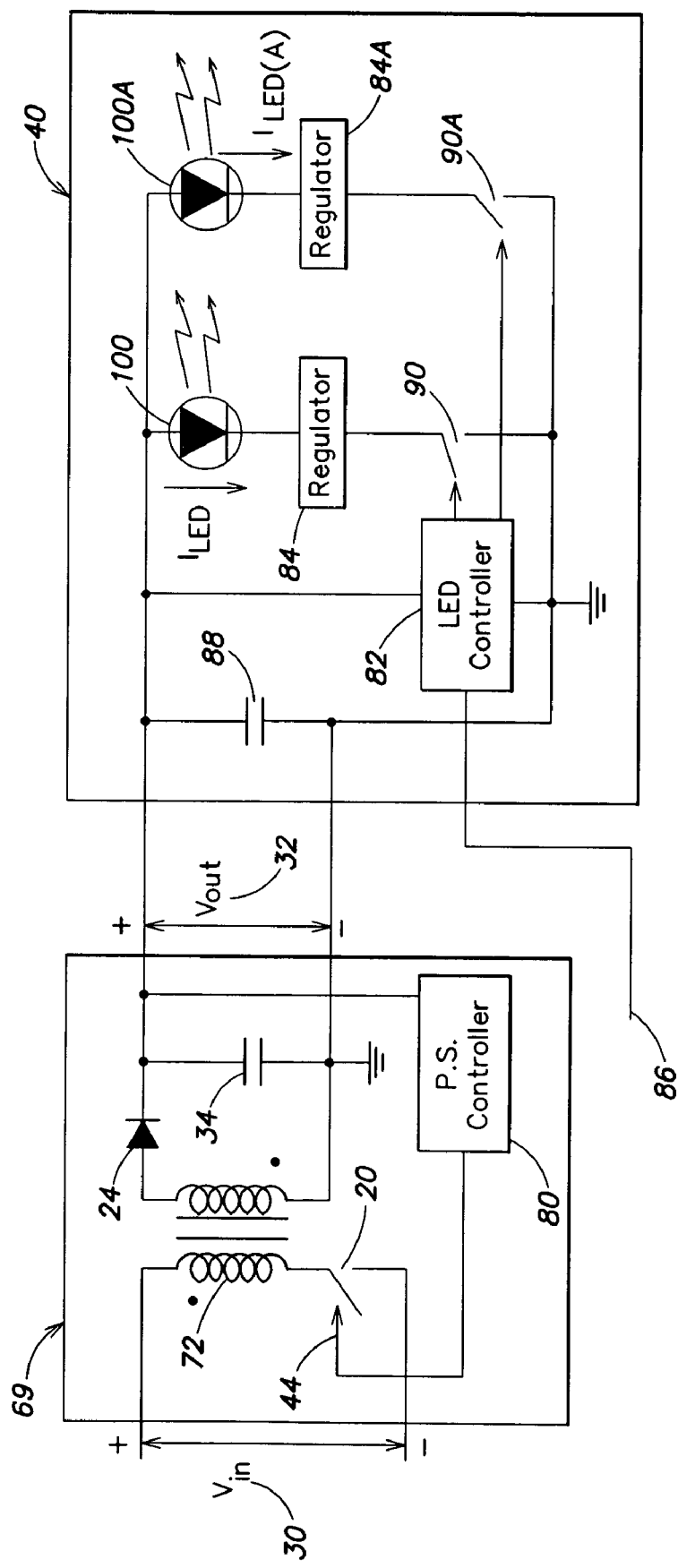
FIG. 12 is a diagram schematically showing another exemplary conventional arrangement of a DC-DC converter coupled to a load that is configured to modulate power delivered to one or more functional components of the load.

In yet another exemplary arrangement illustrated in FIG. 12, in addition to the one or more LEDs 100, the lighting apparatus/load 40 may include one or more additional LEDs 100A having a color different than that of the LED(s) 100. As illustrated in FIG. 12, the circuit arrangement of the LED(s) 100A is similar to that of the LED(s) 100; namely, a common anode of the LED(s) 100A is connected to the positive terminal of $V_{out}$, and a regulator 84A is configured to define the maximum current $I_{LED(A)}$ through the LED(s) 100A when a switch 90A is closed so as to complete the current path. In FIG. 12, the LED controller 82 is configured to also control the switch 90A using a pulse width modulation technique so as to control the average power delivered to the LED(s) 100A over time (and hence the perceived brightness of light generated by the LEDs 100A), as discussed above in connection with FIG. 11.

The LED controller 82 shown in FIG. 12 further may be configured to control the switches 90 and 90A independently (e.g., based on one or more control signals or control data 86) so as to independently adjust the perceived brightness of the differently colored light respectively generated by the LED(s) 100 and the LED(s) 100A. In this manner, a variety of different perceivable colors may be generated by the lighting apparatus based on well-established color mixing principles. It should be appreciated that in other arrangements, lighting apparatus similar to those shown in FIGS. 11 and 12 may include LEDs having three or more different colors, wherein the respective intensities of radiation generated by differently-colored LEDs are controlled independently in a manner similar to that discussed above, so as to generate a wide variety of variable-color light.

In lighting systems based on the general configurations outlined in FIGS. 11 and 12, power factor correction may be desirable for some applications. As discussed above, power factor correction conventionally is deemed to be important for larger loads consuming relatively higher power, in which the input current to the switching power supply may approach the maximum available from the AC power source. Although smaller loads that consume relatively lower power typically do not necessitate power factor correction, Applicants have recognized and appreciated that power factor correction used in connection with relatively lower power loads (e.g., lighting apparatus consuming approximately 10-50 Watts) may nonetheless provide noteworthy advantages in lighting systems employing a significant number of such loads.

In particular, although the power factor of a given low power lighting apparatus may not be significant in and of itself with respect to the current-handling capability of an overall circuit from which the apparatus may draw power (e.g., a 15-20 Amp A.C. circuit at a conventional U.S. or European line voltage), the power factor of such devices becomes more of an issue when several such apparatus are placed on the same A.C. circuit. Specifically, the higher the power factor of the individual low power lighting apparatus, the greater the number of such apparatus that may be safely and reasonably placed on the same power circuit. Accordingly, more complex lighting system installations may be implemented with greater numbers of high power factor, relatively low power, lighting apparatus.

Figure 10:
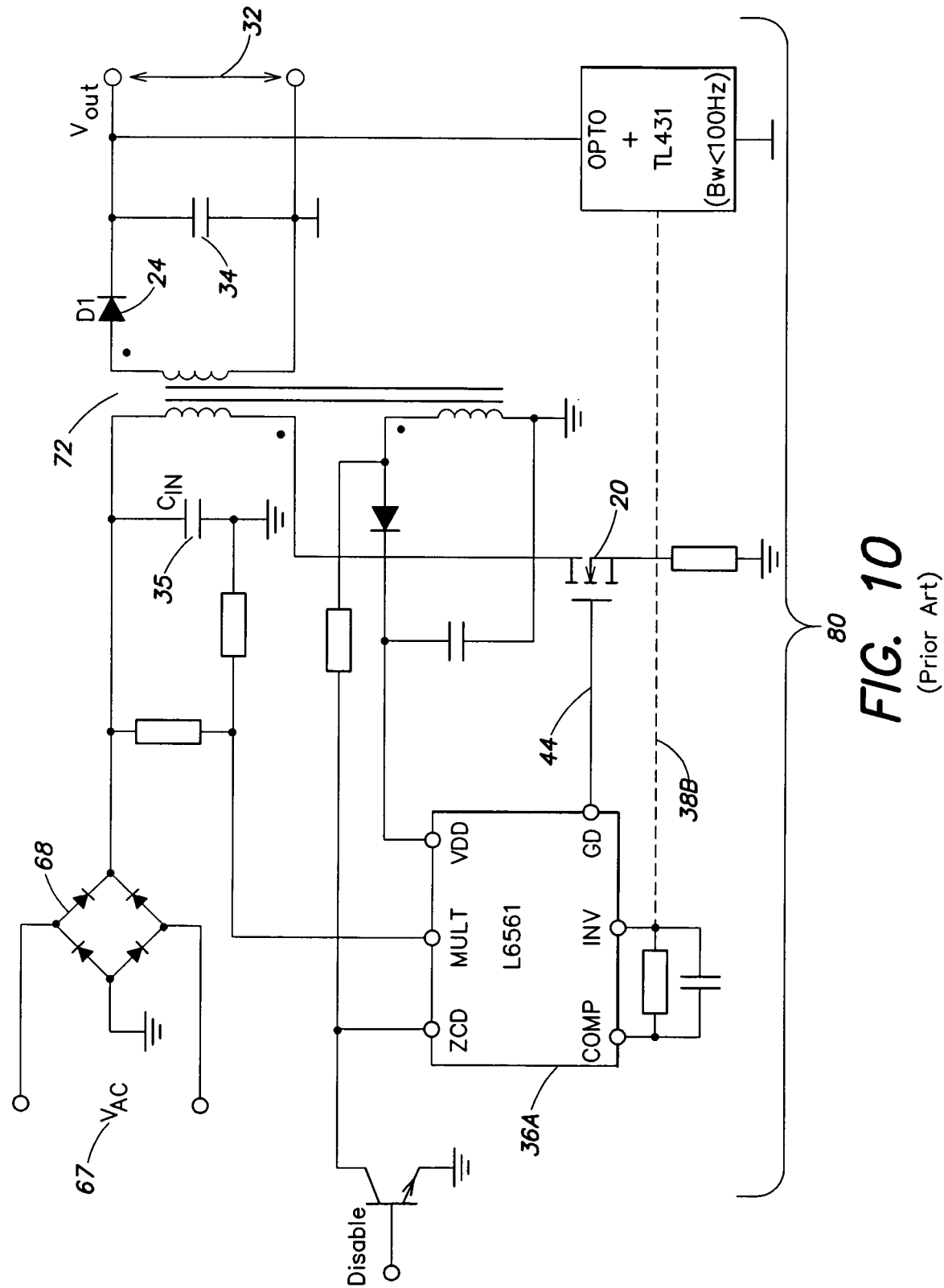
FIG. 10 is circuit diagram of a flyback type DC-DC converter employing an ST Microelectronics L6561 power factor controller in a non-standard configuration.

In view of the foregoing, the high power factor flyback converter arrangement of FIG. 10 provides a potentially attractive candidate for use in a power source for a low power lighting apparatus. Amongst the attractive attributes of such a supply are a relatively low size and parts count, in that only a single switching stage is required (i.e., a separate power factor correction apparatus is not required in addition to a DC-DC converter stage) to provide a high power factor. However, Applicants have identified a number of shortcomings with high power factor single-stage switching power supplies and, in particular, the configuration shown in FIG. 10.

First, if load conditions change such that power to the load varies significantly over a relatively short period of time (e.g., if the load goes from some maximum power draw level or "full on" to essentially "full off"), the feedback loop (including the OPTO+TL431 in FIG. 10) may not be able to react quickly enough to the sudden change in load conditions. In particular, with a sudden near zero or zero load power demand, the converter output provides an "overvoltage" output condition (a higher than desired output voltage), in response to which the feedback loop instructs the controller 36 to significantly reduce the switching duty cycle, or stop switching altogether. In this instance, power to the controller itself (which is derived from a winding of the transformer 72) may drop dramatically, causing an undervoltage condition for the controller that results in the controller entering an "auto restart" mode. If at this point there is a sudden demand for load power (i.e., the load is turned "full on" again), the output capacitor 34 is required to supply the immediate demand for power, and accordingly discharges quickly, resulting in an undesirable "power glitch" to the load while the controller 36 attempts to recover and begin switching action again.

Second, single switching stage high power factor converters as exemplified by the circuit of FIG. 10 require some minimum load for the controller to function properly (this is in part related to the problem discussed immediately above). In particular, the ST L6561 controller includes a feature that essentially shuts down the controller when the load current drops below some minimum threshold. Accordingly, this feature precludes reliable operation for loads that may be significantly variable (e.g., loads that may vary between an on and an off state during normal operation, such as lighting apparatus).

In sum, Applicants have recognized and appreciated that, for relatively low load powers or near zero loads (during which the converter switches to a fully discontinuous mode), high power factor DC-DC converter circuits such as the circuit of FIG. 10 generally suffer from notably poor load regulation, in which long periods of no switching activity are followed by short "bursts" of high switching activity, leading to unpredictable and unstable power delivery.

In view of the foregoing, various embodiments of the present disclosure are directed to modifications to a switching power supply to mitigate potentially adverse effects of highly variable loads, and especially near zero loads, on power delivery.

Figure 13A:
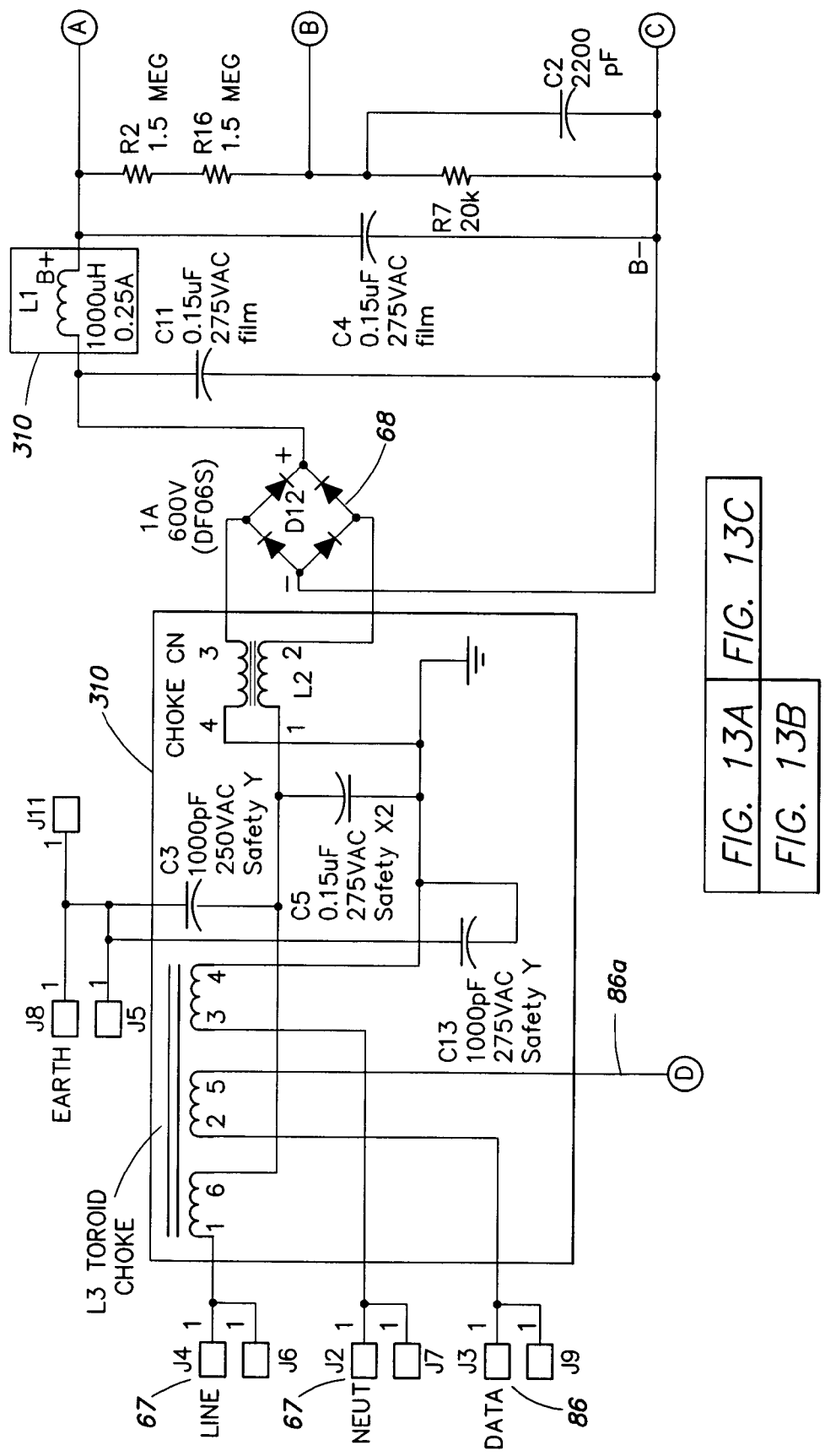
FIG. 13A and FIG. 13C is a schematic diagram of a power supply portion of an apparatus according to one embodiment of the present disclosure.
Figure 13B:
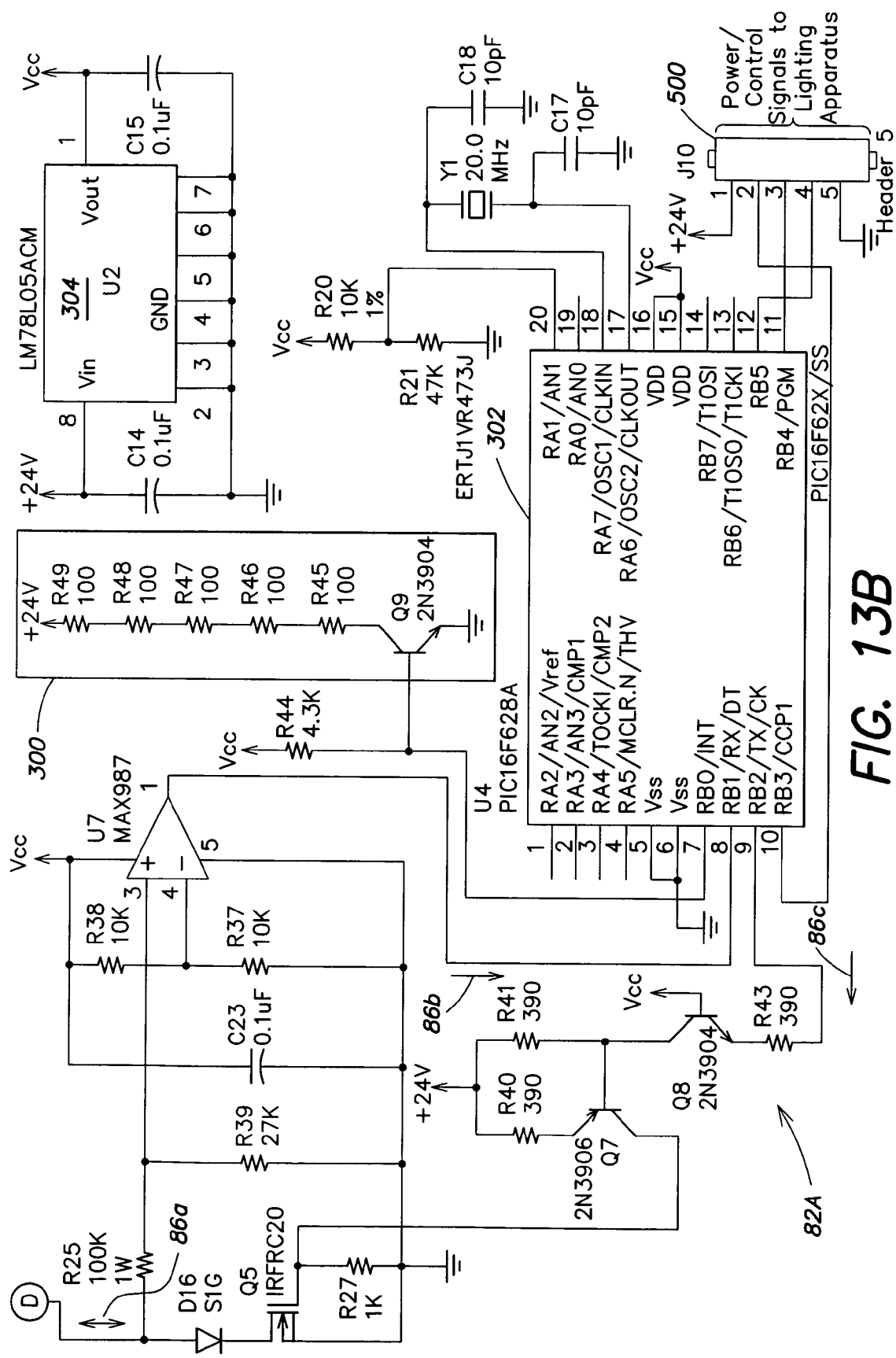
FIG. 13B is a schematic diagram of a processor control portion, including a dummy load, of an apparatus according to one embodiment of the present disclosure.
Figure 13C:
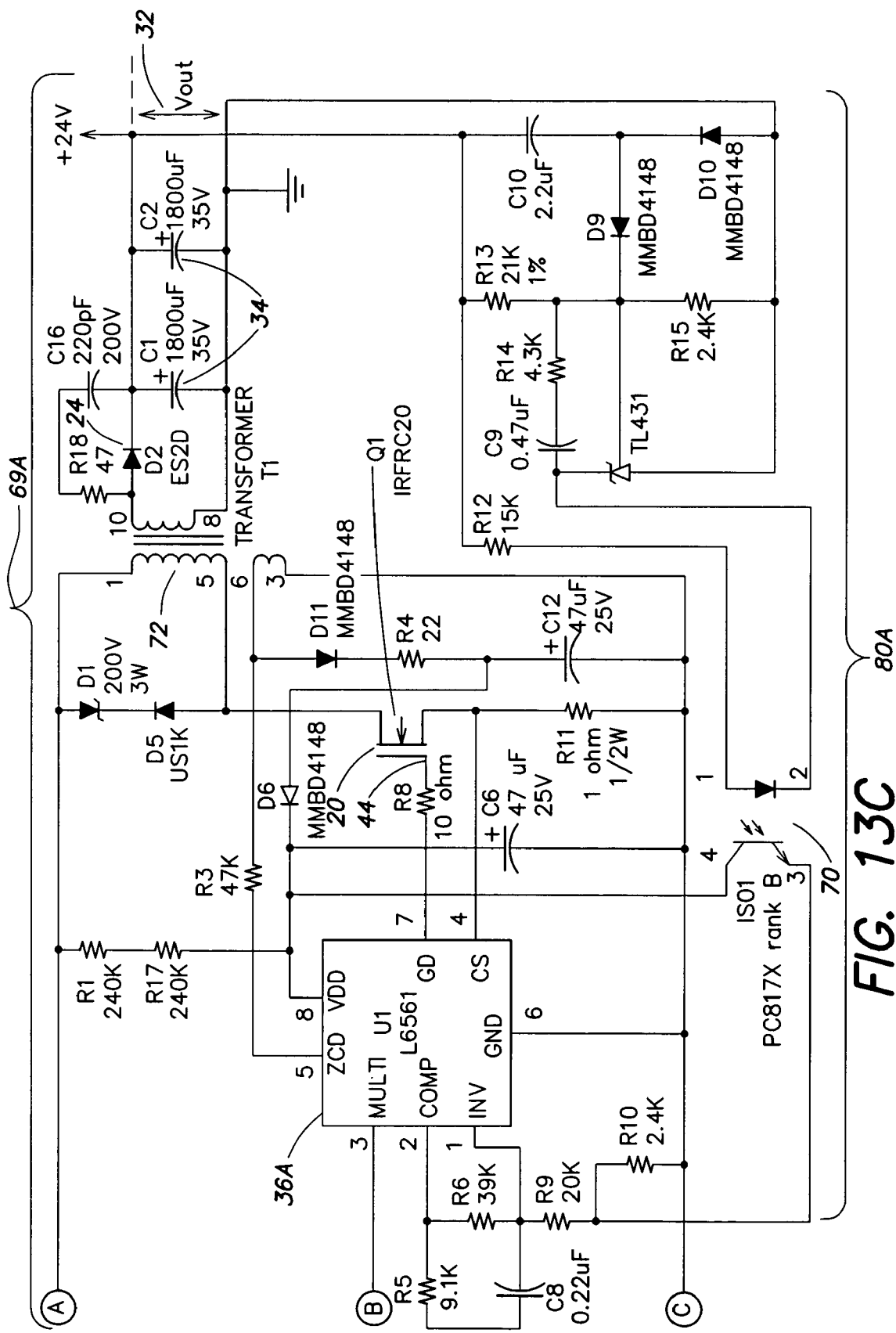

FIGS. 13A and 13B are circuit diagrams illustrating an example of a high power factor, single switching stage, power supply according to one embodiment of the present disclosure. The exemplary power supply configuration shown in FIG. 13A is based on the flyback converter arrangement employing the ST6561 switch controller 36A, discussed above in connection with FIG. 10. In particular, the power supply portion of the apparatus shown in FIG. 13A includes a DC-DC converter section 69A (similar to that shown generally in FIGS. 11 and 12) employing a power supply controller 80A. As in FIG. 10, the power supply controller 80A comprises a feedback loop (including an optoisolator 70 and associated circuitry) as well as the STL6561 controller chip 36A.

To facilitate a significant reduction of undesirable electromagnetic interference, the power supply portion shown in FIG. 13A also includes a number of filtering components 310. In particular, the inductors L1, L2, and L3, together with capacitors C3, C11, C5 and C13, provide for significant noise rejection. In one aspect, the toroid choke L3 includes three windings (rather than the conventional two windings), so that a data signal 86 may be passed through the toroid to minimize corruption of the data path (see the signal 86a, which continues to FIG. 13B). In another aspect, the toroid choke L3 is further optimized to use an extremely high permeability ferrite (e.g., μ>5000), and a small number of tri-filiar co-wound turns.

Another aspect of EMI reduction according to one embodiment includes an optimization of the operating frequencies of the DC-DC converter section 69A. In particular, the converter needs to operate at fairly high frequencies, due to the fact that the input capacitance provided by capacitors C4 and C11 cannot be increased to improve the filtering function without adversely affecting power factor (increasing the input capacitance significantly degrades the power factor at high input voltage, for example on the order of 240 Volts). It should be appreciated, however, that the switching frequency cannot be increased without bound because poor efficiency results.

FIG. 13B illustrates a processing portion 82A of the apparatus according to one embodiment of the disclosure, including a dummy load 300 which is switched across the output voltage $V_{out}$ (e.g., 24 Volts in the present example) in a predetermined manner so as to improve the operation of the DC-DC converter section 69A. In one aspect, the processing portion 82A is similar to the LED controller 82 shown in FIGS. 11 and 12; in particular, a processor 302 may receive input data 86b that is used to control an LED-based lighting apparatus (control signals output by the processor 302, as well as operating power for the LED-based lighting apparatus, may be provided by the connector 500 shown in FIG. 13B). As discussed above, the processor also may transmit data 86c (e.g., handshaking, status, etc.), which ultimately is carried on the signal 86a through the toroid choke L3 shown in FIG. 13A. Also, FIG. 13B illustrates a voltage regulator 304 which provides power for the processor 302 and associated circuitry, based on the output voltage 32 or $V_{out}$ (e.g., 24 Volts) provided by the converter section 69A.

In the circuit of FIG. 13B, the processor may be programmed so as to switch the dummy load 300 across the output voltage $V_{out}$ in any of a number of prescribed manners according to various embodiments. For example, in one embodiment, the average power dissipated in the dummy load may be determined by software executed by the processor so as to compensate for various undesirable activity of the power supply's feedback loop (e.g., slow response time of the feedback loop). In one aspect of this embodiment, the dummy load may be pulse width modulated such that the average power dissipated is at a desired level to achieve appropriate compensation.

In other embodiments, the dummy load may have some fixed or variable value that is switched in below some fixed or variable low power condition threshold. For example, in one embodiment, a low power threshold may be fixed at some predetermined value (e.g., 10% of full load power), and when the load power is determined to be less than this threshold, the dummy load may be switched across $V_{out}$. In one aspect of this embodiment, the dummy load also may have a fixed value (e.g., 10% of full load power), thereby providing a relatively simple solution to ensure that the converter always "sees" some minimal load, thereby avoiding the problems discussed above in connection with FIG. 10.

Figure 14A:
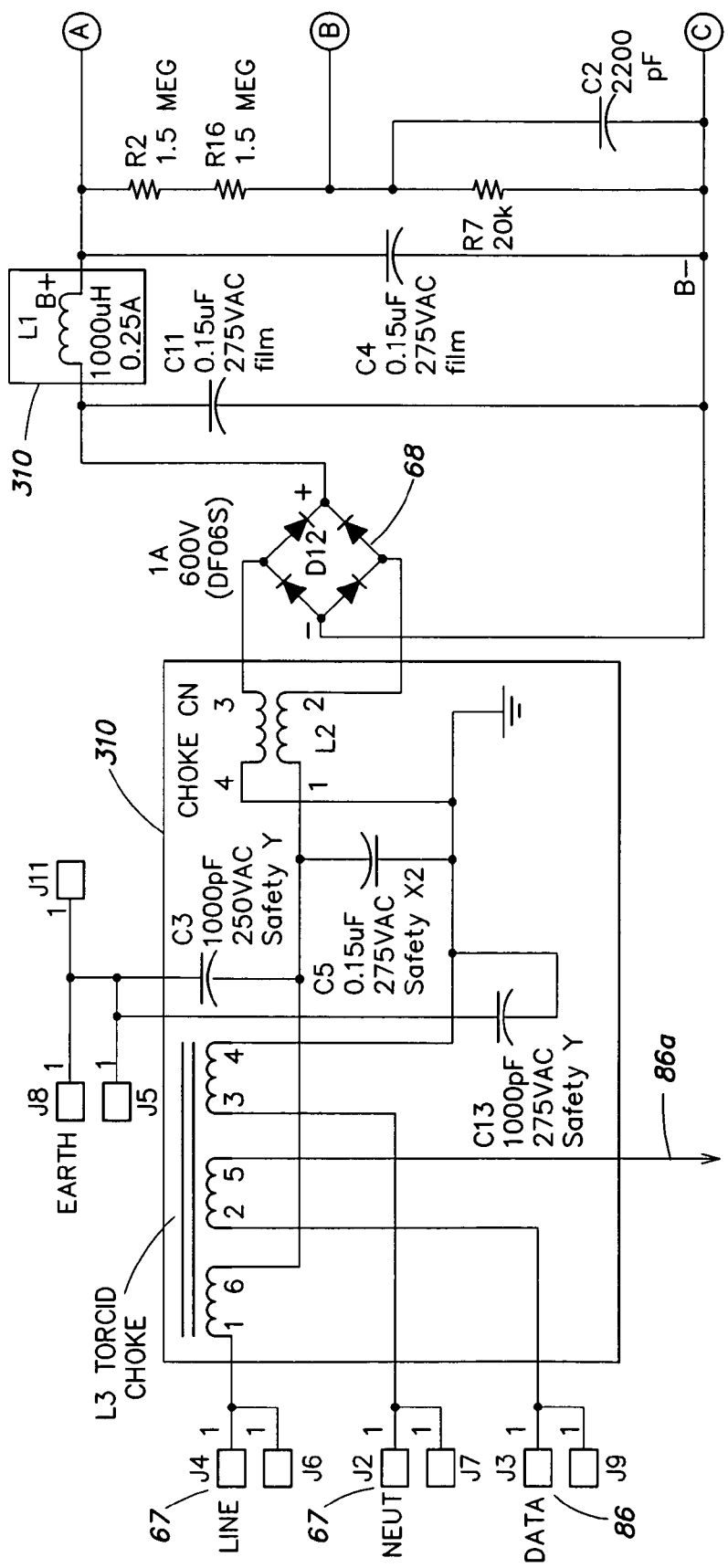
FIG. 14 is a schematic diagram of a power supply portion of an apparatus according to another embodiment of the present disclosure.
Figure 14B:
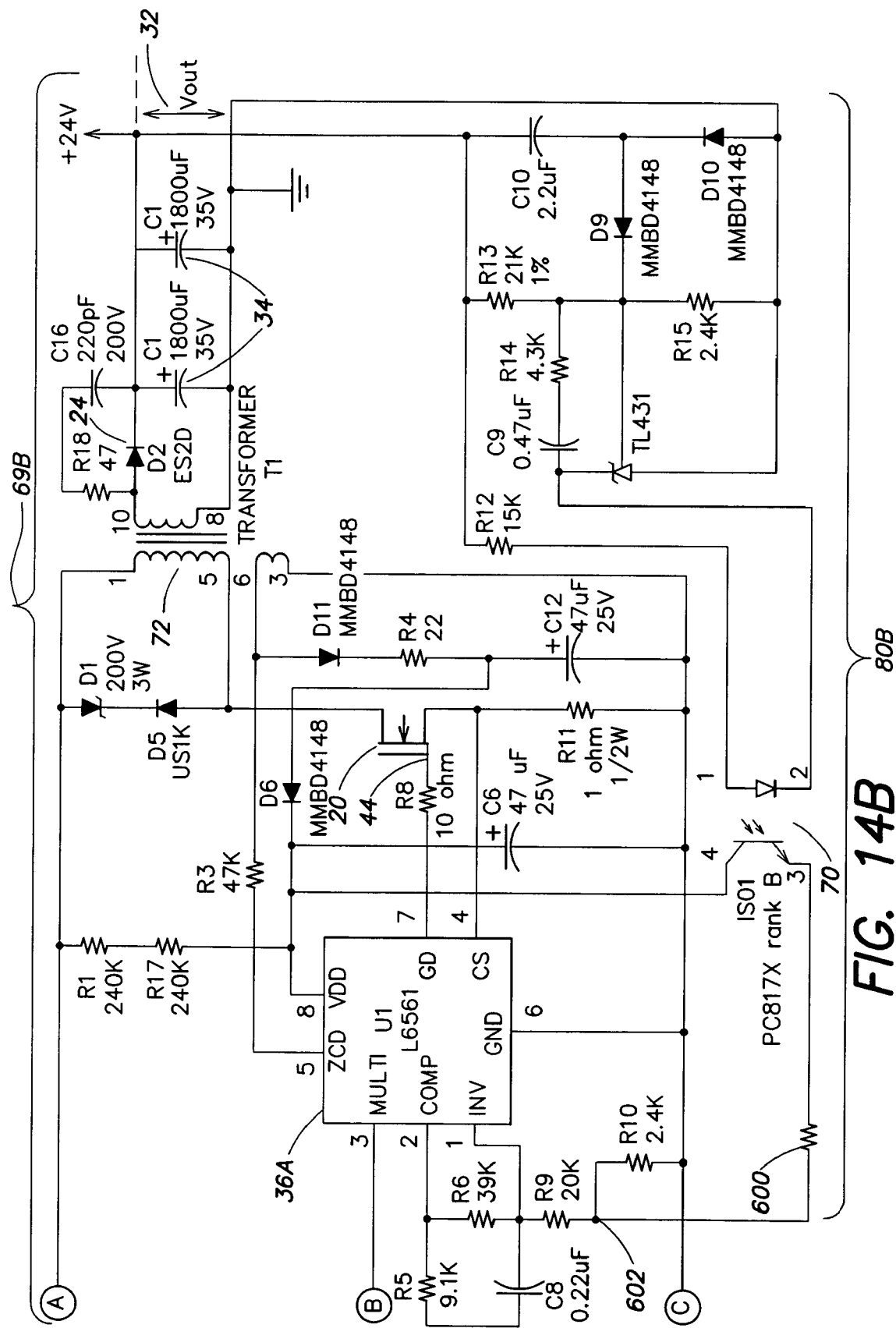

FIG. 14 is a circuit diagram illustrating another example of a high power factor, single switching stage, power supply according to one embodiment of the present disclosure. In one aspect, the power supply illustrated in FIG. 14 may be used in connection with a load control arrangement including a dummy load, as shown in FIG. 13B for example, or other load control arrangements not necessarily including a dummy load. In the embodiment of FIG. 14, the feedback loop 80B is modified from that of FIG. 13A or FIG. 10 to mitigate the effects of a potential overvoltage condition in a bias supply voltage VDD from which the L6561 switch controller 36A draws power (see pin 8 of the controller 36A). As discussed above, this overvoltage condition may occur at low or near zero load power, in response to which the L6561 controller significantly reduces the switching duty cycle, or stops switching altogether. In this situation, power to the controller 36A itself (i.e., the bias supply voltage VDD which is derived from a winding of the transformer 72) may drop dramatically, ultimately causing an undervoltage condition for the controller that in turn results in the controller entering an "auto restart" mode.

To mitigate this situation, in the embodiment of FIG. 14 a resistor 600 is placed in series with the optoisolator 70 in the feedback loop 80B. Upon a sudden load reduction, the output voltage 32 increases, and a maximum current is caused to flow through the optoisolator 70; essentially, the optoisolator 70 acts a short, which connects one side of the resistor 600 to the bias supply voltage VDD. The resistor 600 forms a voltage divider with resistor RIO, thereby providing only a portion of the bias supply voltage VDD at the node 602 as feedback to pin 1 (INV) of the switch controller 36A (the INV input is applied to the overvoltage protection circuit internal to the controller 36A).

Accordingly, as a result of the voltage divider created by resistor 600 and resistor R10, the potential overvoltage condition caused by the sudden load reduction does not necessarily cause the controller 36A itself to detect an overvoltage condition (and, as a result, significantly reduce the duty cycle of the switch 20). If the divided voltage sensed by the controller 36A at the node 602 increases slightly but remains within an acceptable range, the converter section 69B does not go into an overvoltage condition, but rather continues to provide energy to the transformer 72, albeit somewhat reduced based on a slightly reduced switch duty cycle; much of this energy is used to continue to provide the bias supply voltage VDD, with some excess energy still applied to the reduced load. As the bias supply voltage VDD begins to fall, it may reach a point at which the necessary current cannot be maintained, and the switch duty cycle is increased, trying to servo the voltage VDD back to some nominal value expected under "normal" operation.

In sum, in the embodiment of FIG. 14, extreme overvoltage and undervoltage conditions are significantly mitigated by virtue of the voltage divider formed by the resistors 600 and RIO. This allows a power supply implementation in which a value of the output capacitors 34 may be significantly reduced, and hence smaller capacitors may be employed. For some applications, the load also may be reduced essentially to zero (i.e. no dummy load is required), while nonetheless maintaining a suitably stable operation during transient load conditions.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. An apparatus, comprising:
   a switching power supply configured to provide power factor correction and an output voltage to a load via control of a single switch,
   wherein the apparatus is configured to mitigate a significant overvoltage condition in the output voltage as a result of a zero or near-zero power drawn by the load.

2. The apparatus of claim 1, further comprising a processor coupled to the load and configured to control an amount of load power drawn by the load from the output voltage.

3. The apparatus of claim 2, further comprising a dummy load coupled to the processor and the output voltage, wherein the processor is configured to selectively cause the dummy load to draw dummy load power from the output voltage, based on the amount of load power drawn by the load, so as to mitigate the significant overvoltage condition in the output voltage.

4. The apparatus of claim 3, wherein the processor is configured to selectively cause the dummy load to draw the dummy load power from the output voltage based on pulse width modulating the dummy load.

5. The apparatus of claim 3, wherein the processor is configured to cause the dummy load to draw the dummy load power when the load power is below a predetermined threshold power.

6. The apparatus of claim 5, wherein the predetermined threshold power is approximately 10% of a maximum load power drawn by the load.

7. The apparatus of claim 5, wherein the dummy load power approximately equals the predetermined threshold power.

8. The apparatus of claim 7, wherein the predetermined threshold power is approximately 10% of a maximum load power drawn by the load.

9. A method, comprising acts of:
   A) providing power factor correction and an output voltage to a load via control of a single switch; and
   B) mitigating a significant overvoltage condition in the output voltage as a result of a zero or near-zero power drawn by the load.

10. The method of claim 9, wherein the act B) comprises an act of:
    B1) selectively causing a dummy load to draw dummy load power from the output voltage, based on an amount of load power drawn by the load.

11. The method of claim 10, wherein the act B1) comprises an act of:
    selectively causing the dummy load to draw the dummy load power from the output voltage based on pulse width modulating the dummy load.

12. The method of claim 10, wherein the act B1) comprises an act of:
    B2) causing the dummy load to draw the dummy load power when the load power is below a predetermined threshold power.

13. The method of claim 12, wherein the predetermined threshold power is approximately 10% of a maximum load power drawn by the load.

14. The method of claim 12, wherein the act B2) comprises an act of:
    causing the dummy load to draw the dummy load power such that the dummy load power approximately equals the predetermined threshold power.

15. The method of claim 14, wherein the predetermined threshold power is approximately 10% of a maximum load power drawn by the load.

16. The apparatus of claim 1, further comprising the load, wherein the load comprises at least one LED-based light source.

17. The apparatus of claim 16, further comprising a processor coupled to the at least one LED-based light source and configured to control an amount of load power drawn by the at least one LED-based light source from the supply voltage.

18. The apparatus of claim 17, further comprising a dummy load coupled to the processor and the supply voltage, wherein the processor is configured to selectively cause the dummy load to draw dummy load power from the supply voltage, based on the amount of load power drawn by the at least one LED-based light source, so as to mitigate the significant overvoltage condition in the supply voltage.

19. The apparatus of claim 18, wherein the processor is configured to selectively cause the dummy load to draw the dummy load power from the supply voltage based on pulse width modulating the dummy load.

20. The apparatus of claim 18, wherein the processor is configured to cause the dummy load to draw the dummy load power when the load power is below a predetermined threshold power.

21. The apparatus of claim 20, wherein the predetermined threshold power is approximately 10% of a maximum load power drawn by the at least one LED-based light source.

22. The apparatus of claim 20, wherein the dummy load power approximately equals the predetermined threshold power.

23. The apparatus of claim 22, wherein the predetermined threshold power is approximately 10% of a maximum load power drawn by the at least one LED-based light source.

* * * * *